(12) United States Patent
Satake et al.

(10) Patent No.: US 7,834,962 B2
(45) Date of Patent: Nov. 16, 2010

(54) LIQUID CRYSTAL DISPLAY

(75) Inventors: Tetsuya Satake, Tokyo (JP); Takumi Nakahata, Tokyo (JP); Takanori Okumura, Tokyo (JP); Yusuke Yamagata, Tokyo (JP); Takeshi Ono, Tokyo (JP); Naoki Nakagawa, Tokyo (JP); Suguru Nagae, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 156 days.

(21) Appl. No.: 12/330,105

(22) Filed: Dec. 8, 2008

(65) Prior Publication Data

US 2009/0161048 A1    Jun. 25, 2009

(30) Foreign Application Priority Data

Dec. 19, 2007    (JP) .............................. 2007-327215

(51) Int. Cl.
  *G02F 1/1333* (2006.01)
  *G02F 1/1335* (2006.01)
(52) U.S. Cl. ........................... 349/110; 349/56; 349/159
(58) Field of Classification Search .................... 349/56, 349/58, 110, 159, 160
  See application file for complete search history.

(56) References Cited

U.S. PATENT DOCUMENTS

| | | | | |
|---|---|---|---|---|
| 5,273,475 | A * | 12/1993 | Oshikawa | .................... 445/24 |
| 6,801,283 | B2 | 10/2004 | Koyama et al. | |
| 2008/0137013 | A1 | 6/2008 | Kamoshida | |
| 2009/0015747 | A1 * | 1/2009 | Nishizawa et al. | ............. 349/58 |
| 2009/0122223 | A1 * | 5/2009 | Hayano et al. | ................. 349/58 |

FOREIGN PATENT DOCUMENTS

| | | |
|---|---|---|
| JP | 6-3650 | 1/1994 |
| JP | 2004-219769 | 8/2004 |
| JP | 2005-128411 | 5/2005 |
| JP | 2007-94102 | 4/2007 |
| JP | 2007-333818 | 12/2007 |
| JP | 2008-145778 | 6/2008 |

OTHER PUBLICATIONS

U.S. Appl. No. 12/196,864, Aug. 22, 2008, Nishioka et al.
U.S. Appl. No. 12/330,105, Dec. 8, 2008, Satake et al.
U.S. Appl. No. 12/471,970, May 26, 2009, Nakahata et al.

* cited by examiner

*Primary Examiner*—Akm E Ullah
(74) *Attorney, Agent, or Firm*—Oblon, Spivak, McClelland, Maier & Neustadt, L.L.P.

(57) ABSTRACT

In a liquid crystal display (10) having a curved display surface, long sides of pixel structures (11) are arranged along the curve direction (Y) of the display surface and on a side of counter substrate provided is a black matrix having a black matrix opening (41$a$) whose length in the curve direction (Y) is not longer than $E-L\{(T1/2)+(T2/2)+d\}/R$, assuming that the length of the display surface in the curve direction (Y) is L, the thickness of an array substrate is T1, the thickness of the counter substrate is T2, the size of the gap between the array substrate and the counter substrate is d, the radius of curvature of the curved display surface is R and the length of a long side of a pixel electrode (29) provided in each of the pixel structures (11) is E. It thereby becomes possible to suppress display unevenness resulting from positional misalignment of the two substrates due to curvature and provide a liquid crystal display achieving a high-quality display image.

6 Claims, 34 Drawing Sheets

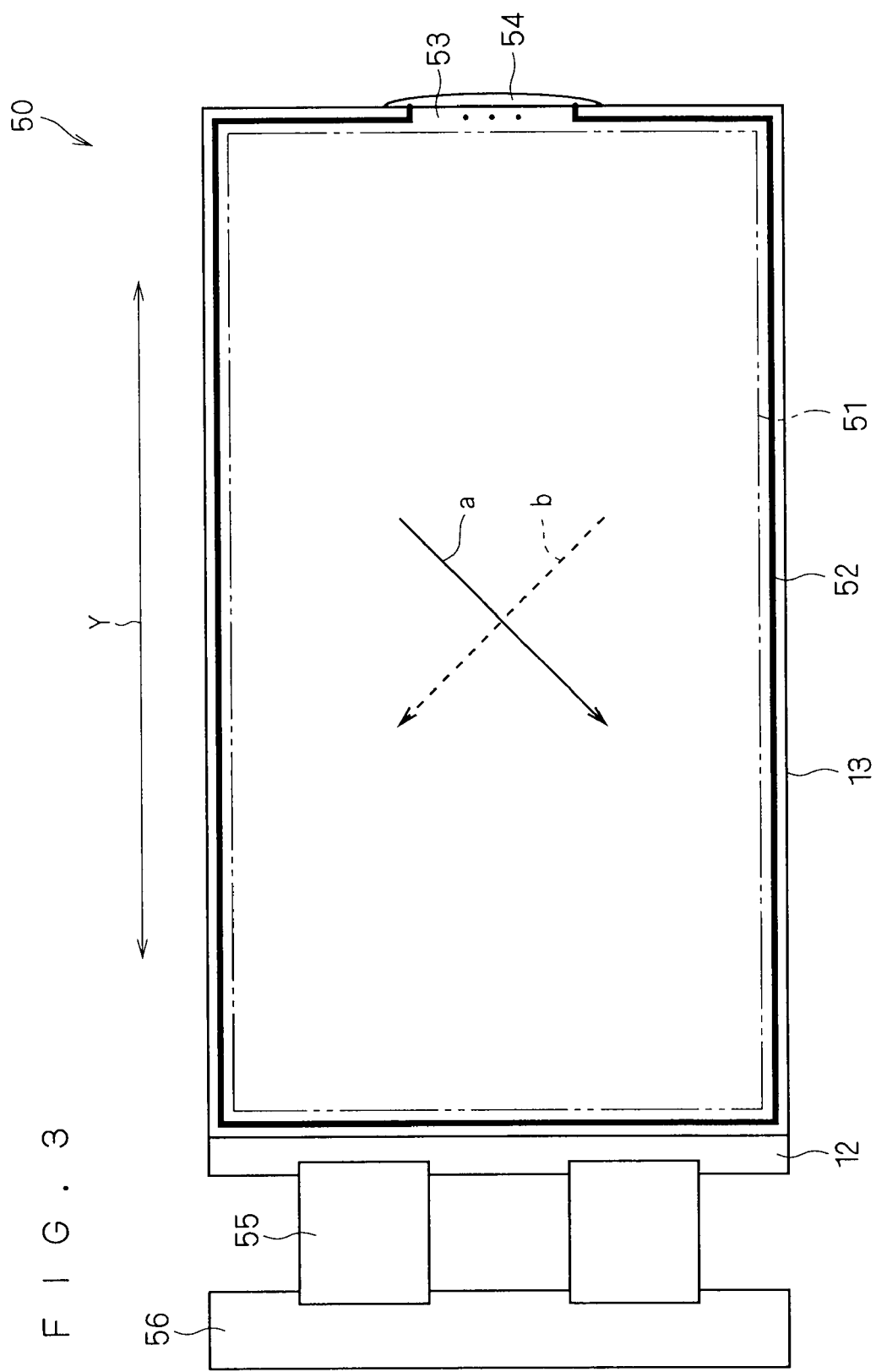

F I G . 6
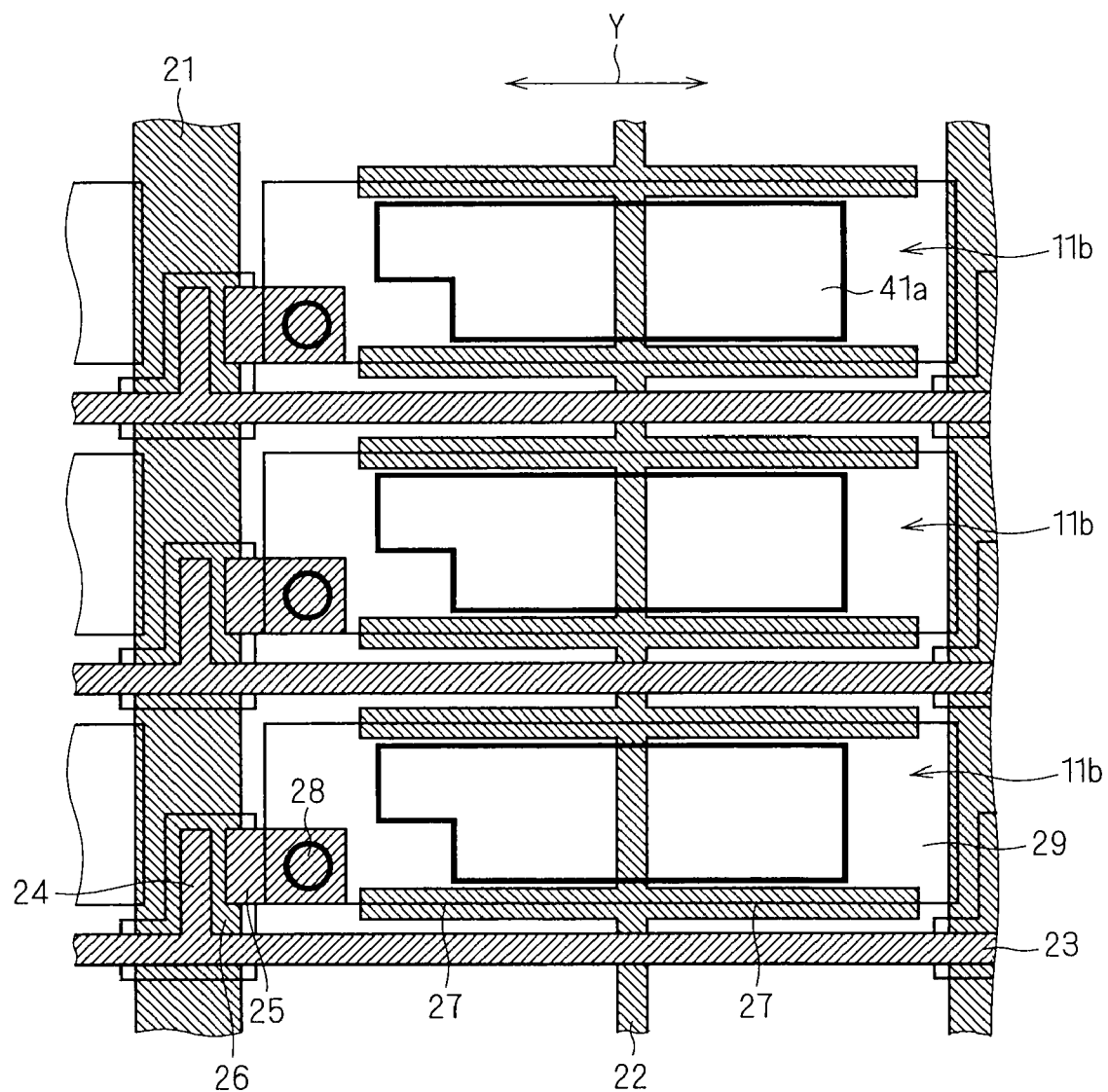

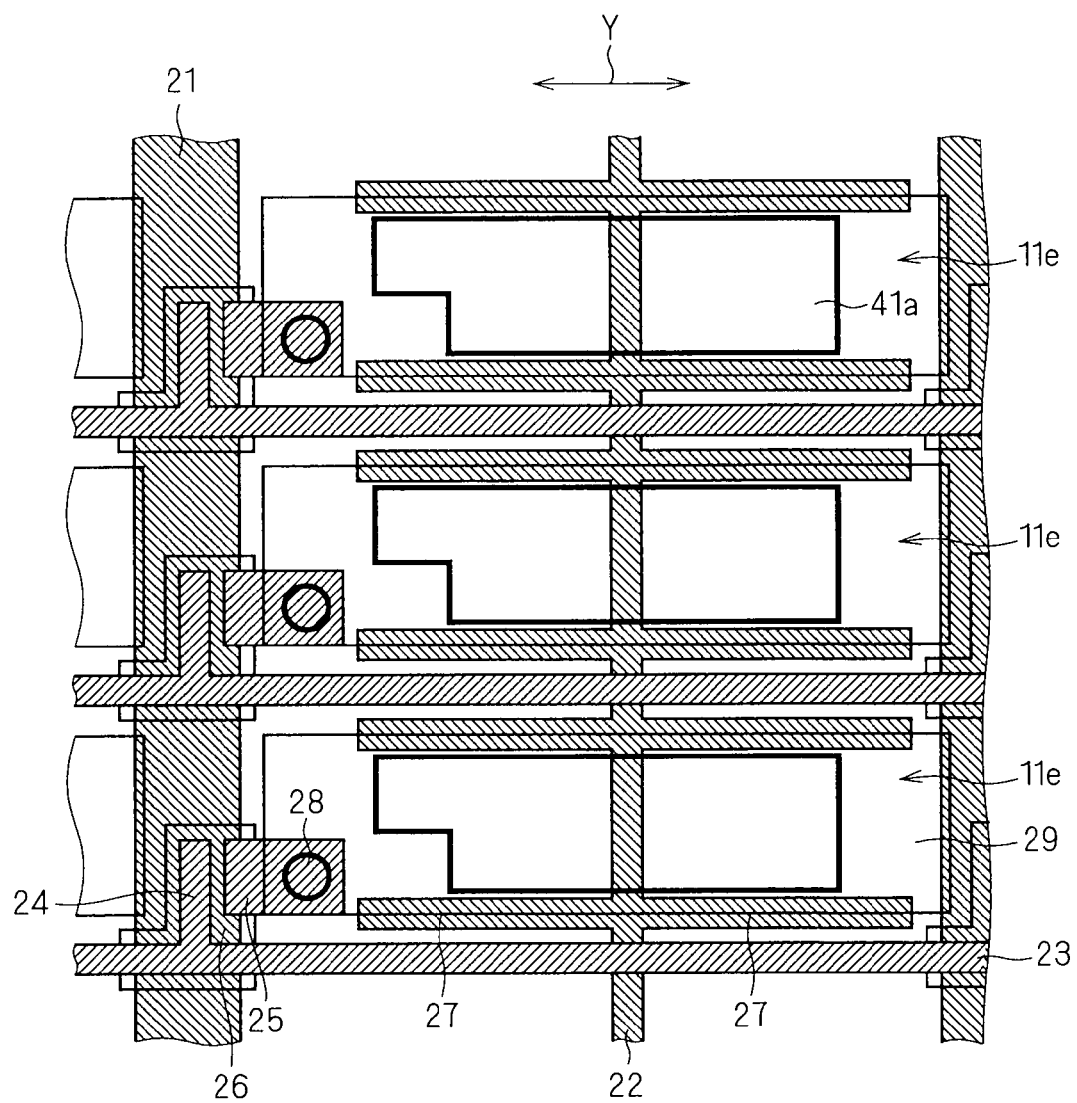
F I G . 2 5

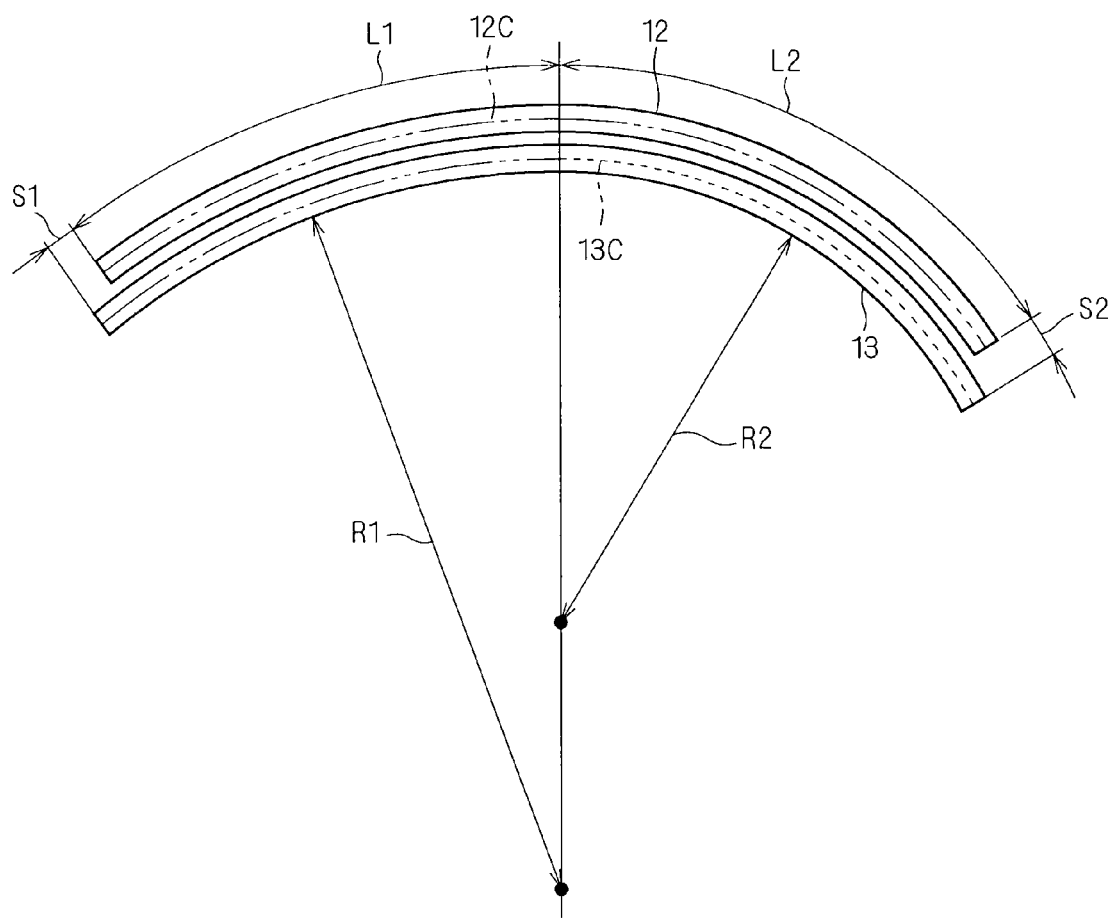
F I G . 3 5

LIQUID CRYSTAL DISPLAY

BACKGROUND OF THE INVENTION

1. Field of the Invention

The present invention relates to a liquid crystal display having a curved display surface.

2. Description of the Background Art

A transmission type liquid crystal display in the background art consists of a liquid crystal panel in which fluid liquid crystal is sealed between a pair of flat glass substrates and polarizing plates are disposed on respective external surfaces of the glass substrates and a backlight, which are stacked, and its display surface is flat. By using a flexible substrate having a thickness of 0.3 mm or less, such as a thin glass substrate, a plastic film or the like, in this transmission type liquid crystal display, a liquid crystal display having a curved display surface can be achieved. Such a liquid crystal display having a curved display surface has a great degree of freedom in design and achieves excellent functions in practical utility. If the display surface has a particular curved form, for example, it is possible to effectively suppress reflection of extraneous light (see, e.g., Japanese Patent Application Laid Open Gazette No. 6-3650).

In manufacturing a liquid crystal display using thin glass substrates, in order to keep the pattern accuracy of various microstructures formed on surfaces of the substrates and ensure easy handling in transfer or the like, thick glass substrates are used till halfway in the manufacturing process, and the two glass substrates are pasted together and then thinned by etching or polishing (see, e.g., Japanese Patent Application Laid Open Gazette No. 2005-128411).

In such a case as above where flat glass substrates are pasted together and then thinned and curved, disadvantageously, luminance unevenness occurs in displaying an image and display unevenness thereby occurs. This is caused by the fact that the curvatures of the two glass substrates vary by almost the thicknesses of the substrates and the relative positions of pixel structures arranged on these substrates become misaligned in the curve direction. Such positional misalignment is caused not only in the case where thin glass substrates are used but also in the case where plastic films are used as substrates, when flat substrates are pasted together and then curved.

Another method of manufacturing a liquid crystal display using flexible thin glass substrates is proposed, where a wall structure of resin is formed in a liquid crystal layer and two substrates are bonded by the wall structure, to suppress the positional misalignment (see, e.g., Japanese Patent Application Laid Open Gazette No. 2004-219769). In the method disclosed in the above Patent Document, since a photocurable resin is mixed into liquid crystal and the wall structure and the substrates are bonded by light emission, uncured components are sometimes left in the liquid crystal as impurities. When the uncured components are left in the liquid crystal as impurities, it disadvantageously becomes easier to cause display failures such as burn-in and the like.

Still another method is proposed, where pixel structures such as color filters, black matrixes and the like which are usually formed on a counter substrate are formed on the side of an array substrate (see, e.g., Japanese Patent Application Laid Open Gazette No. 2007-94102). In such a method, however, since a process of manufacturing color filters, black matrixes and the like is added to the process of manufacturing the array substrate, though these processes are usually performed concurrently, the time period required to manufacture the whole liquid crystal display disadvantageously becomes longer.

SUMMARY OF THE INVENTION

The present invention is intended for a liquid crystal display. According to a first aspect of the present invention, the liquid crystal display includes an array substrate, a counter substrate and a liquid crystal layer. The array substrate has a plurality of rectangular pixel structures which are arranged in matrix. The counter substrate is opposed to the array substrate and has a color filter and a black matrix. The liquid crystal layer is held between the array substrate and the counter substrate. Further, the liquid crystal display has a curved display surface formed of the array substrate and the counter substrate both being curved. Long sides of the pixel structures are arranged along a curve direction of the display surface. A rectangular pixel electrode is provided in each of the pixel structures, with its long side being arranged along the long side of the pixel structure. The length of an opening sectioned by the black matrix in the curve direction is not longer than $E-L\{(T1/2)+(T2/2)+d\}/R$, where L is the length of the display surface in the curve direction, T1 is the thickness of the array substrate, T2 is the thickness of the counter substrate, d is the size of a gap between the array substrate and the counter substrate, R is the radius of curvature of the curved display surface and E is the length of the long side of the pixel electrode provided in each of the pixel structures.

The liquid crystal display of the present invention can suppress a light leak occurring around the pixel electrode provided in each of the pixel structures and suppress display unevenness resulting from positional misalignment between the array substrate and the counter substrate due to curvature.

Further, the liquid crystal display can suppress a decrease in luminance as compared with a case where short sides of the pixel structures are arranged along the curve direction of the display surface.

Therefore, it is possible to provide a liquid crystal display achieving a high-quality image display with less display unevenness and high luminance.

According to a second aspect of the present invention, the liquid crystal display includes an array substrate, a counter substrate and a liquid crystal layer. The array substrate has a plurality of rectangular pixel structures which are arranged in matrix. The counter substrate is opposed to the array substrate and has a color filter and a black matrix. The liquid crystal layer is held between the array substrate and the counter substrate. Further, the liquid crystal display has a curved display surface formed of the array substrate and the counter substrate both being curved. Long sides of the pixel structures are arranged along a curve direction of the display surface. The length of an opening sectioned by the black matrix in the curve direction is not longer than $P-L\{(T1/2)+(T2/2)+d\}/R$, where L is the length of the display surface in the curve direction, T1 is the thickness of the array substrate, T2 is the thickness of the counter substrate, d is the size of a gap between the array substrate and the counter substrate, R is the radius of curvature of the curved display surface and P is the length of the long side of each of the pixel structures.

The liquid crystal display of the present invention can suppress a light leak occurring around the pixel electrode provided in each of the pixel structures and suppress display unevenness resulting from positional misalignment between the array substrate and the counter substrate due to curvature.

Further, the liquid crystal display can suppress a decrease in luminance as compared with the case where short sides of the pixel structures are arranged along the curve direction of the display surface.

Therefore, it is possible to provide a liquid crystal display achieving a high-quality image display with less display unevenness and high luminance.

It is an object of the present invention to suppress display unevenness resulting from positional misalignment between two substrates due to curvature and to thereby provide a liquid crystal display achieving a high-quality display image.

These and other objects, features, aspects and advantages of the present invention will become more apparent from the following detailed description of the present invention when taken in conjunction with the accompanying drawings.

BRIEF DESCRIPTION OF THE DRAWINGS

FIG. 3 is a plan view showing a constitution of a liquid crystal panel 50 in the liquid crystal display 10 before being curved;

FIG. 6 is a plan view showing pixel structures 11b in a second display area M2 of the liquid crystal panel 50;

FIG. 25 is a plan view showing pixel structures 11e in a second display area M12 of the liquid crystal panel 50;

FIG. 35 is a cross section viewed from the plane of the array substrate 12 and the counter substrate 13 along the curve direction Y in a case where the display surface is curved with different curvatures;

DESCRIPTION OF THE PREFERRED EMBODIMENTS

The First Preferred Embodiment

Figure 1:
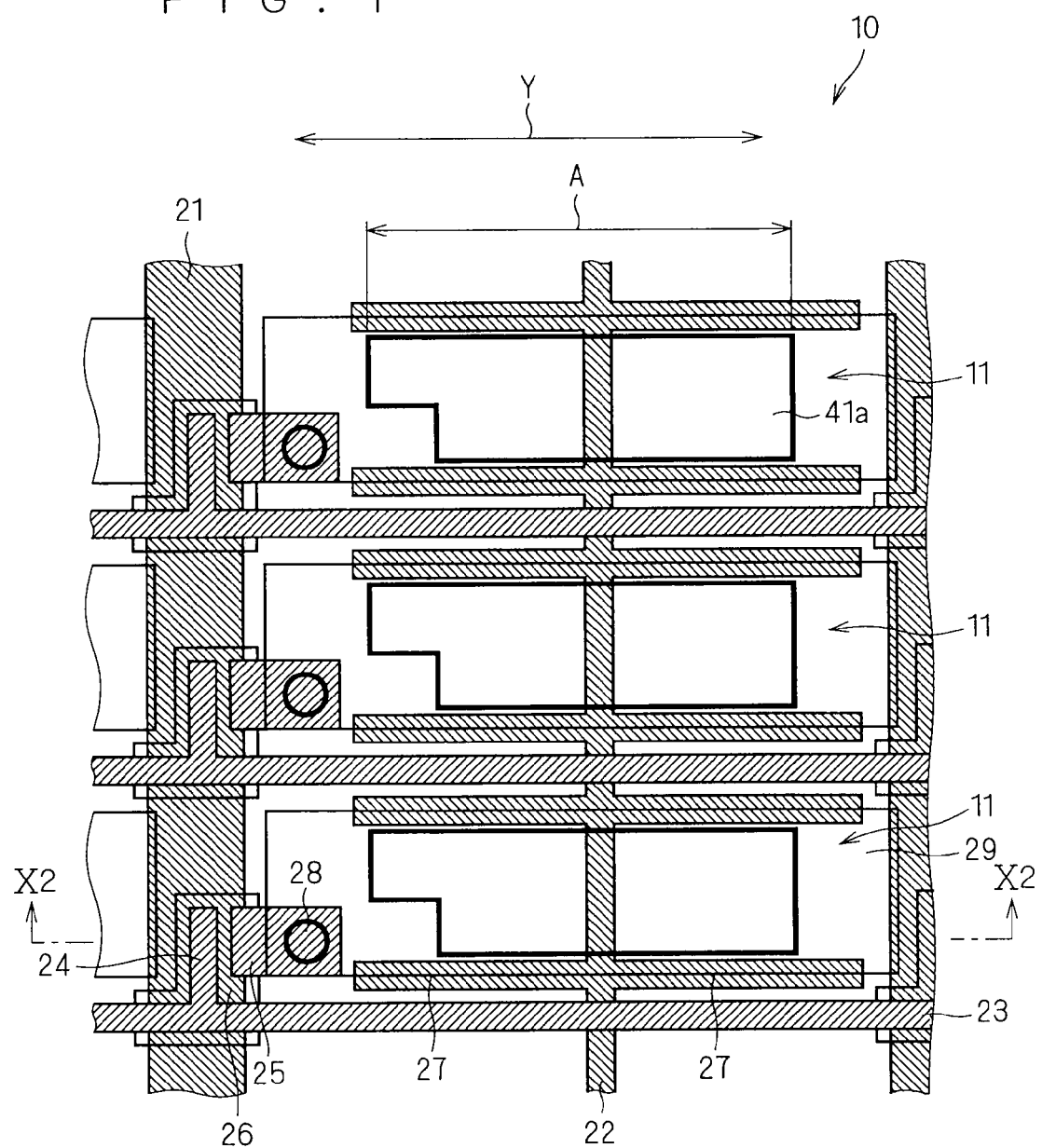
FIG. 1 is a plan view showing pixel structures 11 in a liquid crystal display 10 of a first preferred embodiment of the present invention.
Figure 2:
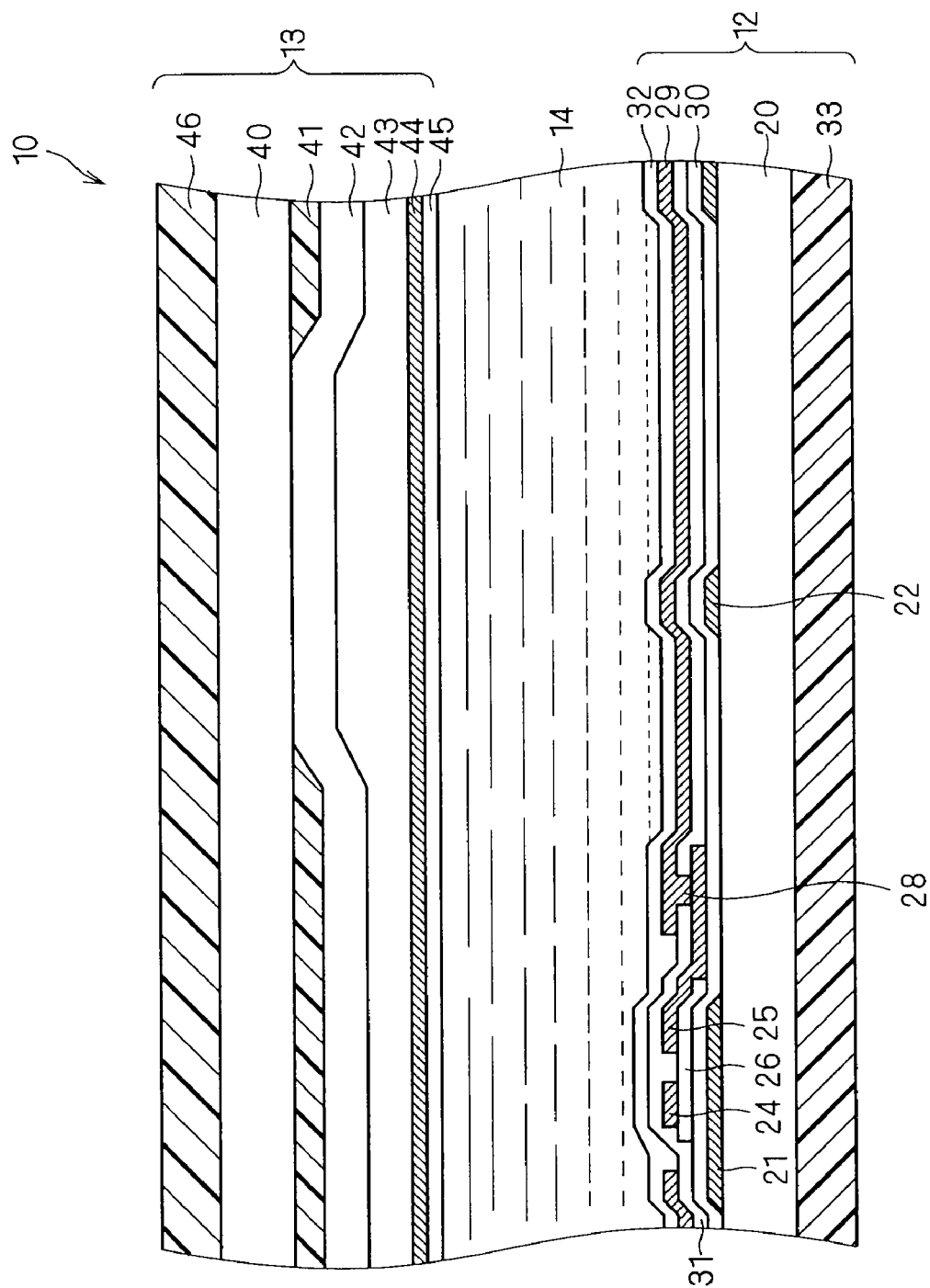
FIG. 2 is a cross section viewed from the section line X2-X2 of FIG. 1.

FIG. 1 is a plan view showing pixel structures 11 in a liquid crystal display 10 of the first preferred embodiment of the present invention. FIG. 2 is a cross section viewed from the section line X2-X2 of FIG. 1. In a display area of the liquid crystal display 10 of the first preferred embodiment, a plurality of rectangular pixel structures 11 are arranged in matrix. Further, the pixel structures 11 are arranged with their long sides along the curve direction Y that is a direction in which a display surface for displaying an image thereon is curved. FIG. 1 shows three pixel structures 11, for easy understanding. In the image display device 10, each pixel is combined with any one of color filters 42 of red (R), green (G) and blue (B) and color display is performed with three pixels used as one unit. In the first preferred embodiment, the color filters 42 of these colors are formed like a strip, extending in the curve direction Y, and aligned in a direction orthogonal to the curve direction Y, being arranged in a stripe manner.

Each pixel structure 11 is formed of an array substrate 12, a counter substrate 13 and a liquid crystal layer 14 held between the array substrate 12 and the counter substrate 13.

The array substrate 12 comprises a glass substrate 20, a scanning wire 21 and a common wire 22 which are disposed on a display surface of the glass substrate 20 on one side in its thickness direction, that is to say, on the display surface of the glass substrate 20 on the side of the liquid crystal layer 14, a signal wire 23, a gate electrode (part of the scanning wire 21 in FIGS. 1 and 2), a source electrode 24, a drain electrode 25, a semiconductor layer (amorphous silicon film) 26, an auxiliary capacitance electrode 27, a contact hole 28, a pixel electrode 29, a first insulating film 30, a second insulating film 31 and an array substrate-side orientation film 32 which are provided on one side of the glass substrate 20 in its thickness direction and an array substrate-side polarizing plate 33 disposed on a display surface of the glass substrate 20 on the other side in its thickness direction, that is to say, on one of the two display surfaces of the glass substrate 20 in its thickness direction on a side opposite to the side on which the scanning wire 21 and the common wire 22 are disposed.

In FIG. 1, for easier understanding, the scanning wire 21, the common wire 22, the signal wire 23, the source electrode 24, the drain electrode 25, the semiconductor layer 26, the auxiliary capacitance electrode 27 and the contact hole 28 are hatched. The pixel electrode 29 has a rectangular shape and is disposed with its long side along the curve direction Y, that is to say, along the long side of the pixel structure 11.

The counter substrate 13 comprises a glass substrate 40, a black matrix 41 disposed on a display surface of the glass substrate 40 on one side in its thickness direction, that is to say, on the display surface of the glass substrate 40 on the side of the liquid crystal layer 14, a color filter 42 provided on display surfaces of the black matrix 41 and the glass substrate 40 on one side in their thickness direction, an overcoat film 43, a counter electrode 44 and a counter substrate-side orientation film 45 which are provided on one side of the glass substrate 40 in its thickness direction, and a counter substrate-side polarizing plate 46 disposed on a display surface of the glass substrate 40 on the other side in its thickness direction, that is to say, on one of the two display surfaces of the glass substrate 40 in its thickness direction on a side opposite to the side on which the black matrix 41 is disposed.

The black matrix 41 is so provided as to cover the scanning wire 21, the common wire 22, the signal wire 23, a TFT (Thin Film Transistor) switching element and the auxiliary capacitance electrode 27 which are provided on the array substrate 12, in other words, as to be superimposed on the scanning wire 21, the common wire 22, the signal wire 23, the TFT switching element and the auxiliary capacitance electrode 27 in the thickness direction of the array substrate 12, and a black matrix opening 41a is formed therein to expose the pixel electrode 29 therefrom. In FIG. 1, for easy understanding, the reference sign for the black matrix 41 is omitted and the black matrix opening 41a is shown with its reference sign.

The black matrix opening 41a has a substantially rectangular shape and is arranged with its long side along the curve direction Y. In more detail, the black matrix opening 41a is formed correspondingly to the shape of the TFT switching element, with one end portion thereof in a longitudinal direction along the curve direction Y and in a lateral (shorter) direction orthogonal to the longitudinal direction being cut out. Hereinafter, among the lengths of the black matrix opening 41a in the curve direction Y, the longest length is referred to as the length of the black matrix opening 41a in the curve direction Y.

The pixel structures on the side of the array substrate 12 and on the side of the counter substrate 13 are formed with their shapes projected on one virtual plane perpendicular to the thickness direction of these substrates 12 and 13 being rectangles of the same size. Among the wires and the electrodes provided on the array substrate 12 and the counter substrate 13, the scanning wire 21, the common wire 22, the signal wire 23, the gate electrode, the source electrode 24, the drain electrode 25 and the auxiliary capacitance electrode 27 are formed of opaque metal materials such as aluminum (Al), molybdenum (Mo) and the like. The pixel electrode 29 and the counter electrode 44 are formed of transparent conductive materials such as indium tin oxide (ITO) and the like.

Next, discussion will be made on function and operation of each structure disposed in each pixel structure 11. When a pulse-like selection voltage is applied to the scanning wire 21, the pixels of the same row which are aligned in a direction parallel to the scanning wire 21, in other words, in a vertical direction of the paper in FIG. 1 are selected. During the selection period while the selection voltage is applied to the scanning wire 21, an image signal voltage is applied to the signal wire 23. During the above selection period, the TFT switching element constituted of the gate electrode, the source electrode 24, the drain electrode 25, the semiconductor layer 26 and the first insulating film 30 is turned on, and the image signal voltage is applied from the source electrode 24 connected to the signal wire 23 to the drain electrode 25 and the image signal voltage is applied from the source electrode 24 to the pixel electrode 29 connected to the drain electrode 25 through the contact hole 28. Thus, the image signal voltage is applied to the pixel electrodes 29 in the same row in unison.

Subsequently, the selection voltage is applied to an adjacent scanning wire 21 and the above operation is thereby repeated. Through repetition of this operation, the respective image signal voltages are applied to all the pixel electrodes 29 in the display area. In a pixel during the non-selection period while the selection voltage is not applied, since the TFT switching element is turned off and there is a high resistance between the source electrode 24 and the drain electrode 25, the potential of the pixel electrode 29 is maintained. In order to reduce the variation in potential of the pixel electrode 29 during the non-selection period (sustain period), an auxiliary capacitance is formed between the auxiliary capacitance electrode 27 connected to the common wire 22 and the pixel electrode 29.

A predetermined voltage is applied to the counter electrode 44 provided in the counter substrate 13, and the voltage applied across the pixel electrode 29 and the counter electrode 44 varies the orientation state of liquid crystal molecules in the liquid crystal layer 14 held therebetween. The level of voltage across the pixel electrode 29 and the counter electrode 44 adjusts the birefringent property of the liquid crystal layer 14, and the transmittance of light passing through each pixel is controlled with the combination of the array substrate-side polarizing plate 33 provided in the array substrate 12 and the counter substrate-side polarizing plate 46 provided in the counter substrate 13.

The transmission light of each pixel is colored with any one of red (R), green (G) and blue (B) by the color filter 42 disposed in the counter substrate 13. On a display surface of the color filter 42 on one side in its thickness direction, the transparent overcoat film 43 is disposed, and this overcoat film 43 flattens the display surface of the counter substrate 13 on the side of the liquid crystal layer 14 and cuts off diffusion of impurities from the color filter 42 to the liquid crystal layer 14.

At that time, the voltage corresponding to an image signal is applied across the pixel electrode 29 and the counter electrode 44 in each pixel structure 11, but the voltage corresponding to the image signal is not applied to a portion without the pixel electrode 29 on the side of the array substrate 12 and desired transmittance can not be achieved. The portion without the pixel electrode 29 is light-shielded by providing the black matrix 41 in a predetermined position corresponding thereto on the side of the counter substrate 13.

Next, discussion will be made on a constitution of the liquid crystal panel 50 in the liquid crystal display 10 of the first preferred embodiment. FIG. 3 is a plan view showing a constitution of the liquid crystal panel 50 in the liquid crystal display 10 before being curved. In a display area 51 shown in FIG. 3, a plurality of pixel structures 11 shown in FIG. 1 are arranged in matrix. The array substrate 12 and the counter substrate 13 are pasted together by using a main seal 52 disposed around display area 51 so that the pixel structures 11 of the array substrate 12 and those of the counter substrate 13 can be overlapped one another.

The counter electrode 44 of the counter substrate 13 is electrically connected to wires on the side of the array substrate 12 by using a not-shown transfer agent disposed outside the main seal 52. In the main seal 52 on one of the two short sides of the array substrate 12, specifically on the short side on the right hand of FIG. 3 in this preferred embodiment, an opening (hereinafter, referred to as "liquid crystal inlet") 53 for injection of the liquid crystal is formed. The external side of the liquid crystal inlet 53 is closed with a sealing agent 54.

In the array substrate 12, one of the two short sides which is opposite to the side on which the liquid crystal inlet 53 is provided, specifically the short side on the left hand of FIG. 3 extends off, not overlapping the counter substrate 13, as viewed from one side in the thickness direction of the counter substrate 13. The wires routed to this extending portion are connected to an external circuit substrate 56 with flexible substrates 55.

In the interface between the array substrate 12 and the liquid crystal layer 14 and the interface between the counter substrate 13 and the liquid crystal layer 14, the array substrate-side orientation film 32 and the counter substrate-side orientation film 45 for controlling the orientation state of the liquid crystal molecules are disposed, respectively. In the first preferred embodiment, a display surface of the counter substrate-side orientation film 45 on the side of the liquid crystal layer 14 is subjected to an orientation process by a rubbing method in the direction indicated by the arrow a in FIG. 3, and a display surface of the array substrate-side orientation film 32 on the side of the liquid crystal layer 14 is subjected to the orientation process by the rubbing method in the direction indicated by the arrow b in FIG. 3, which is orthogonal to the direction a of the orientation process of the counter substrate-side orientation film 45.

By using a liquid crystal material with left-handed chirality, the twist orientation of 90 degrees in a counterclockwise direction is achieved from the side of the counter substrate 13 toward the side of the array substrate 12, specifically from the front side toward the backside of the paper in FIG. 3. Further, by arranging the optical axes, i.e., the transmission axes or the absorbing axes of the counter substrate-side polarizing plate 46 and the array substrate-side polarizing plate 33 parallel to the respective orientation process directions of the array substrate 12 and the counter substrate 13, brightness control can be achieved so that it will be "dark" when the voltage is applied to the liquid crystal layer 14 and "bright" when not applied.

In the constitution of the liquid crystal panel 50 shown in FIG. 3, in a state where the liquid crystal panel 50 is disposed so that the direction orthogonal to the curve direction is a vertical direction, since the liquid crystal molecules rise from the upper direction relative to the surface of the array substrate 12, specifically from the direction of 12 o'clock in applying the voltage, this is called a TN (Twisted Nematic) mode of 12 o'clock viewing angle. In the TN mode of 12 o'clock viewing angle, a wide viewing angle characteristic is achieved in the curve direction Y which is the lateral direction, i.e., a horizontal direction of the display surface, and a tone inversion phenomenon occurs in the upper direction.

By curving the liquid crystal panel 50 in the horizontal direction as discussed above and providing a backlight 67 shown in FIG. 21 discussed later on a rear side of the array substrate 12, the liquid crystal display 10 having a curved display surface is achieved. Both when the display surface is curved convexly and when curved concavely, the curve direction Y coincides with the direction of wide viewing angle in the TN mode.

Though FIG. 3 shows the constitution of the liquid crystal panel 50 in the TN mode of 12 o'clock viewing angle, a wide viewing angle is achieved in the lateral direction also in the TN mode of 6 o'clock viewing angle. In the case of 6 o'clock viewing angle, both the orientation process directions of the orientation films in the array substrate 12 and the counter substrate 13 are opposite to those in the TN mode of 12 o'clock viewing angle and the tone inversion phenomenon occurs in the lower direction.

Figure 4:
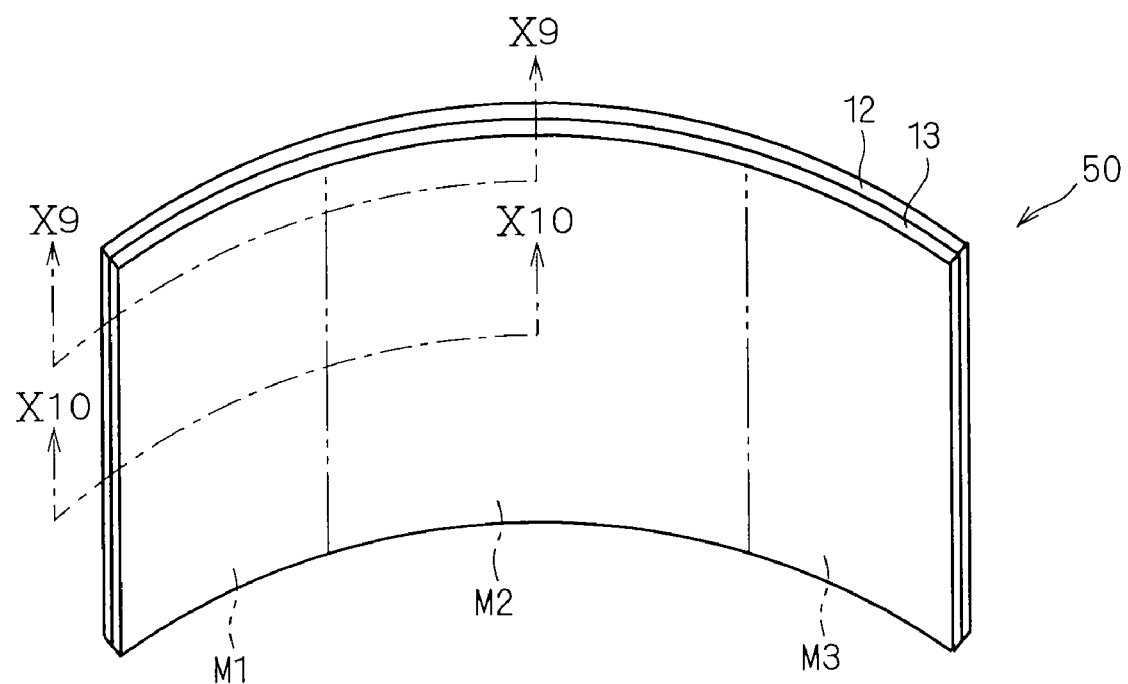
FIG. 4 is a perspective view showing the liquid crystal panel 50 with its display surface being curved concavely.
Figure 5:
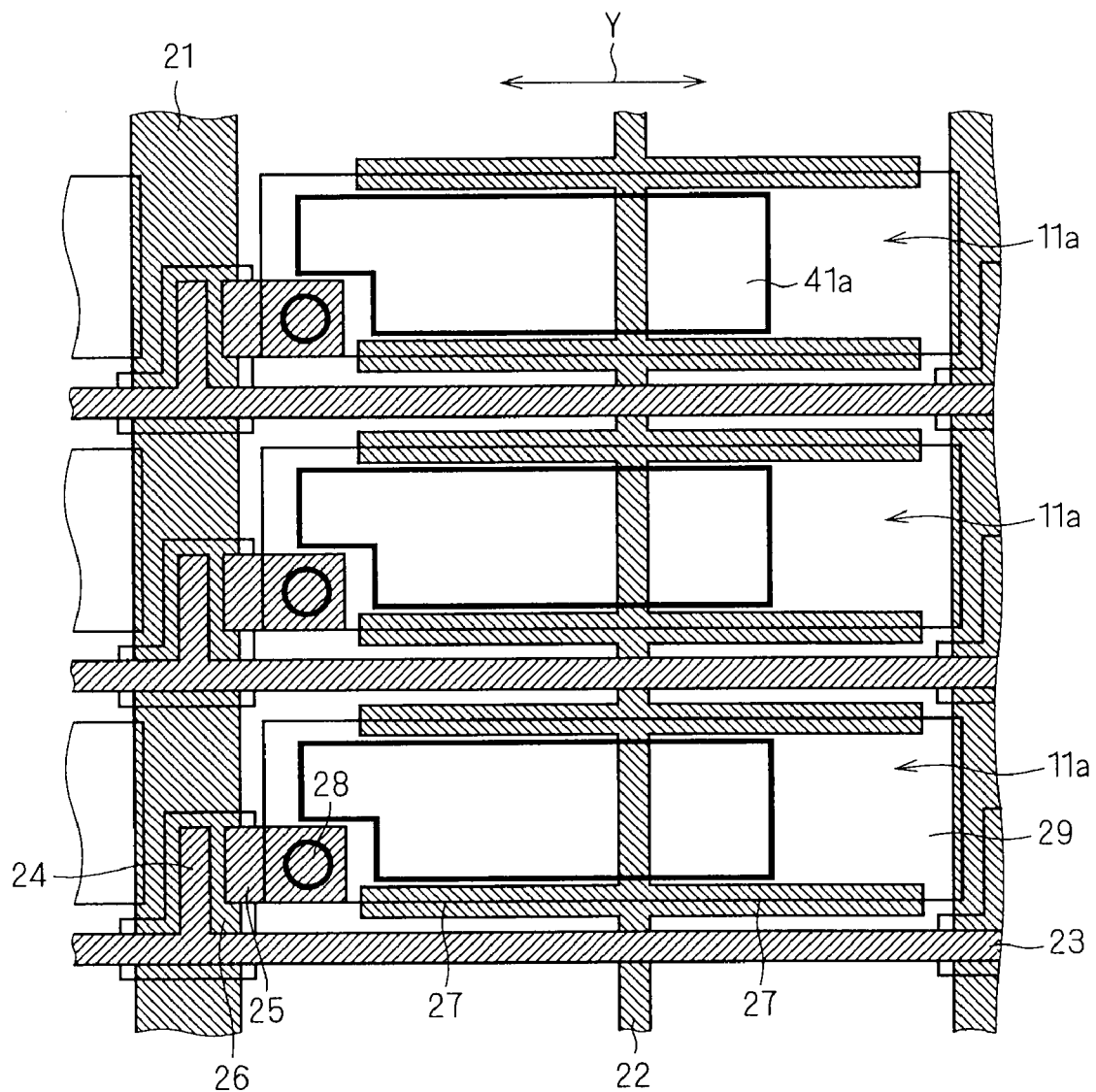
FIG. 5 is a plan view showing pixel structures 11a in a first display area M1 of the liquid crystal panel 50.
Figure 7:
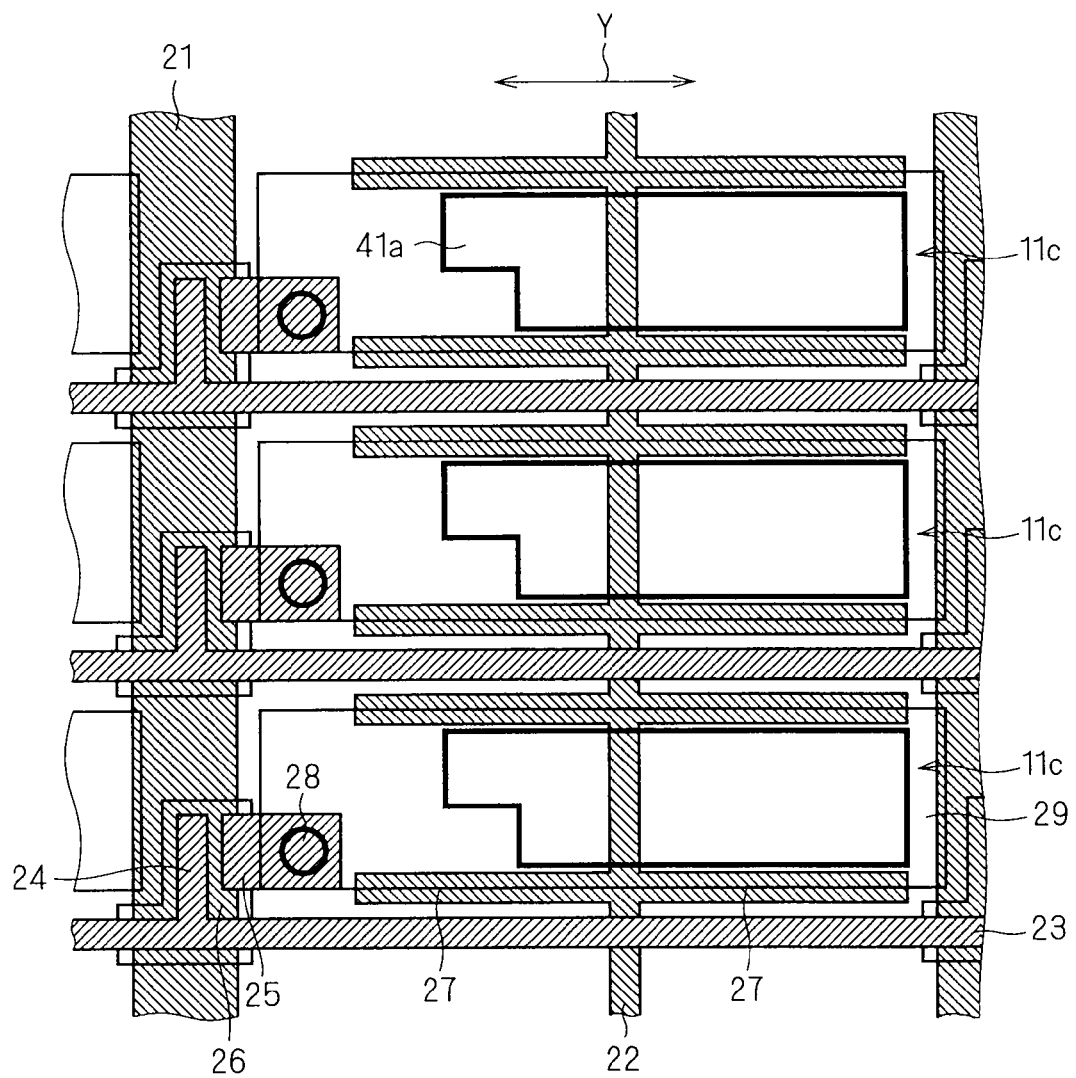
FIG. 7 is a plan view showing pixel structures 11c in a third display area M3 of the liquid crystal panel 50.

Next, discussion will be made on the pixel structures 11 in the case where the liquid crystal panel 50 in the liquid crystal display 10 is curved. FIG. 4 is a perspective view showing the liquid crystal panel 50 with its display surface being curved concavely. FIG. 5 is a plan view showing pixel structures 11a in a first display area M1 of the liquid crystal panel 50. FIG. 6 is a plan view showing pixel structures 11b in a second display area M2 of the liquid crystal panel 50. FIG. 7 is a plan view showing pixel structures 11c in a third display area M3 of the liquid crystal panel 50.

FIG. 4 schematically shows the liquid crystal panel 50 only with the array substrate 12 and the counter substrate 13. The respective structures of the pixel structures 11a to 11c shown in FIGS. 5 to 7 are similar to the structure of the pixel structures 11 shown in FIG. 1, but only the positions of the black matrix openings 41a are different from that of FIG. 1. Therefore, herein discussion will be made only on the positions of the black matrix openings 41a in the pixel structures 11a to 11c of FIGS. 5 to 7, and constituent elements identical to those in FIG. 1 are represented by the same reference signs and the same description as in FIG. 1 will be omitted.

The second display area M2 of the liquid crystal panel 50 is around the center portion of the display area, and as to the pixel structures 11b of the second display area M2, as shown in FIG. 6, the positional relation between those of the array substrate 12 and the counter substrate 13 is maintained, as it is when the display surface is flat, not being curved.

The first display area M1 and the third display area M3 of the liquid crystal panel 50 are areas on both ends of the display area, and as to the pixel structures 11a and 11c of the first and third display areas M1 and M3, as shown in FIGS. 5 and 7, the pixel structures of the counter substrate 13 are deviated outside in the lateral direction. More specifically, as shown in FIGS. 5 and 7, the black matrix openings 41a are deviated laterally.

Figure 8:
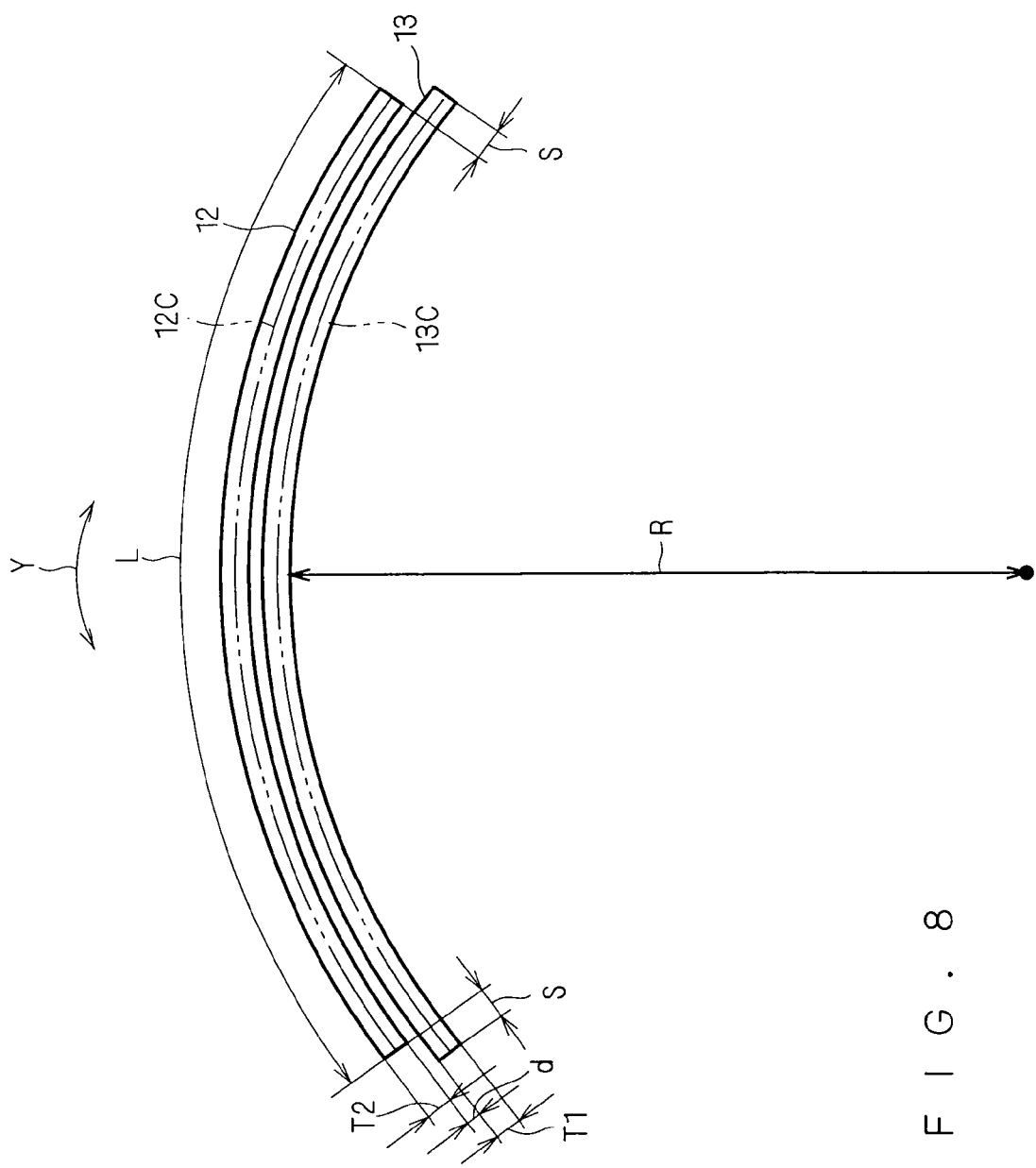
FIG. 8 is a cross section viewed from the plane of an array substrate 12 and a counter substrate 13 along the curve direction Y as the liquid crystal panel 50 is curved.

Next, discussion will be made on a mechanism of causing a positional misalignment of the pixel structures of the array substrate 12 and the counter substrate 13. FIG. 8 is a cross section viewed from the plane of the array substrate 12 and the counter substrate 13 along the curve direction Y as the liquid crystal panel 50 is curved. FIG. 8 shows the positional misalignment caused when the array substrate 12 and the counter substrate 13 are curved concavely. Though originally the array substrate 12 and the counter substrate 13 are pasted together by the main seal 52 all around except the liquid crystal inlet 53, the main seal 52 in FIG. 8 only serves to keep the gap (hereinafter, sometimes referred to as "panel gap") between the array substrate 12 and the counter substrate 13 and FIG. 8 shows a cross section in a case where it is assumed that the array substrate 12 and the counter substrate 13 freely move along the curve direction Y.

When the liquid crystal panel 50 is curved so that the surface of the counter substrate 13 may become concave with its radius of curvature R, assuming that the thickness of the counter substrate 13 is T1, the thickness of the array substrate 12 is T2 and the panel gap is d, the neutral plane of the counter substrate 13, i.e., the neutral plane 13C of the counter substrate 13 in its thickness direction and the neutral plane of the array substrate 12, i.e., the neutral plane 12c of the array substrate 12 in its thickness direction are different from each other in radius of curvature by $\{(T1/2)+(T2/2)\}+d$. This difference in radius of curvature between the array substrate 12 and the counter substrate 13 causes the positional misalignment. Assuming that the length of the display area in the curve direction Y is L, the length S of the positional misalignment in the case where there occurs uniform misalignment on both sides in the curve direction Y is expressed by the following Eq. (1).

$$S = \frac{L\left(\frac{T1}{2} + \frac{T2}{2} + d\right)}{2\left(R + \frac{T1}{2}\right)} \quad \text{(Eq. 1)}$$

Since the thickness T1 of the counter substrate 13 is so much smaller than the radius of curvature R, R>>T1. Therefore, the length S of the positional misalignment is approximate to L $\{(T1/2)+(T2/2)+d\}/2R$. If the thickness of the array substrate 12 and that of the counter substrate 13 are equal, the length S of the positional misalignment is expressed by the following Eq. (2) assuming that each thickness of the array substrate 12 and the counter substrate 13 is T.

$$S = \frac{L(T+d)}{2R} \quad \text{(Eq. 2)}$$

In an actual liquid crystal panel 50, however, since the display area is strongly bonded almost all around by the main seal 52, the condition is different a little from the case of FIG. 8.

Figure 9:
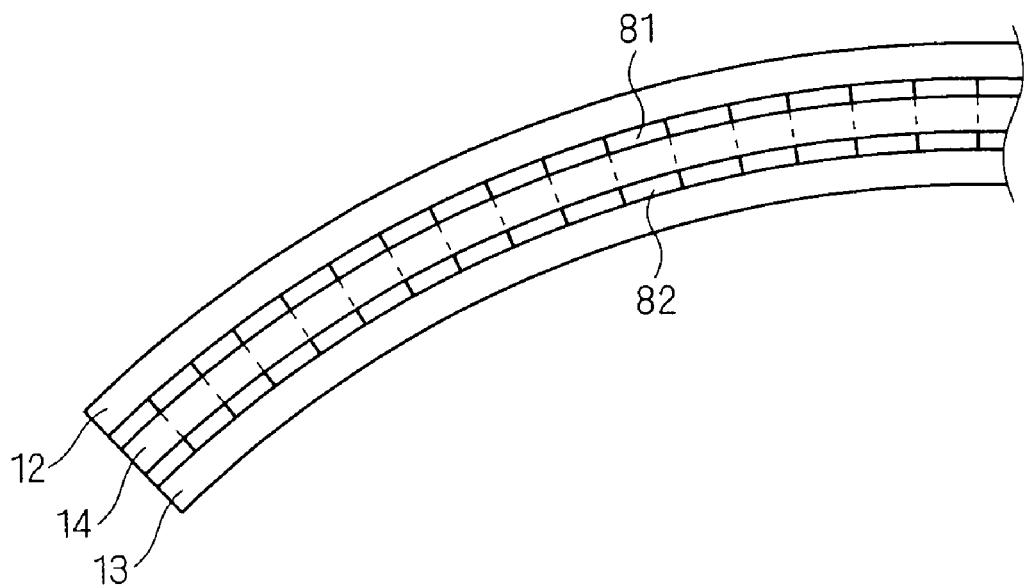
FIG. 9 is a cross section viewed from the section line X9-X9 of FIG. 4.
Figure 10:
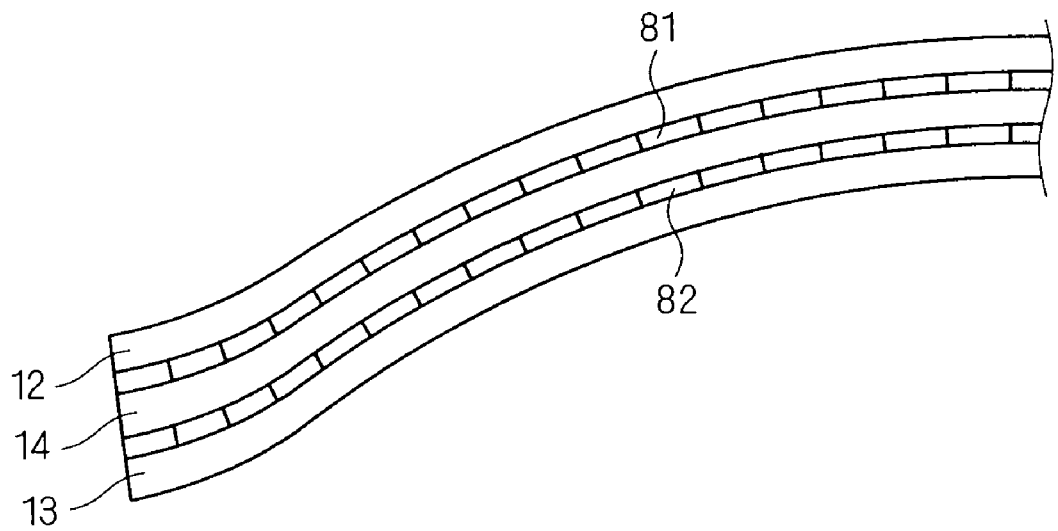
FIG. 10 is a cross section viewed from the section line X10-X10 of FIG. 4.

FIG. 9 is a cross section viewed from the section line X9-X9 of FIG. 4, and FIG. 10 is a cross section viewed from the section line X10-X10 of FIG. 4. FIGS. 9 and 10 show cross sections in the curve direction in the case where an actual liquid crystal panel 50 is curved so that the surface of the counter substrate 13 may become concave and schematically show only the array substrate 12, the counter substrate 13 and the pixel structures on the inner surfaces of the array substrate 12 and the counter substrate 13.

In an area near the main seal 52 in one side portion of the display area 51 of the liquid crystal panel 50 in its width direction, as to the array substrate 12 and the counter substrate 13, the positional misalignment between the pixel structures (hereinafter, sometimes referred to as "array substrate-side pixel structure") 81 of the array substrate 12 and the pixel structures (hereinafter, sometimes referred to as "counter substrate-side pixel structure") 82 of the counter substrate 13 is controlled entirely in the curve direction by the main seal 52 in the neighborhood, as shown in FIG. 9. Also in the area near the main seal 52 in another side portion of the display area 51 of the liquid crystal panel 50 in its width direction, similarly, the positional misalignment between the array substrate-side pixel structure 81 and the counter substrate-side pixel structure 82 is controlled.

In contrast to this, since the array substrate 12 and the counter substrate 13 are fixed by the main seal 52 only at both end portions of the display area 51 of the liquid crystal panel 50 in the longitudinal direction in an area near the center portion of the display area 51 of the liquid crystal panel 50 in its width direction, there occurs larger positional misalignment due to the difference in radius of curvature between the two substrates 12 and 13 as the distance from the area near the center portion of the display area 51 of the liquid crystal panel 50 in its width direction increases, as shown in FIG. 10. Since the two substrates 12 and 13 are fixed at both end portions of the display area 51 of the liquid crystal panel 50 in its longitudinal direction, the positional misalignment sharply decreases near both the end portions in its longitudinal direction. Since the compression stress in the inner-side counter substrate 13 significantly increases at both the end portions of the counter substrate 13 in its longitudinal direction, the curvature at both the end portions in the longitudinal direction decreases, or as the liquid crystal panel 50 is curved in the reverse direction, the stress in the counter substrate 13 is relieved. FIG. 10 exaggeratedly shows one end portion in the longitudinal direction. Though the shape of the end portion has a curvature that is different from the original one, it is difficult to control the shape of the end portion as discussed later.

In an actual liquid crystal panel 50, the positional misalignment due to the difference in radius of curvature between the array substrate 12 and the counter substrate 13 occurs in the first display area M1 and the third display area M3 shown in FIG. 4. Though the amount of positional misalignment varies with mechanical properties of the substrates such as Young's modulus or the like or an environmental temperature, its maximum value is the length expressed by above-discussed Eq. (1) or Eq. (2).

Next, on the basis of the mechanism of causing positional misalignment of the respective pixel structures of the array substrate 12 and the counter substrate 13, discussion will be made on the shape of the black matrix opening 41a for preventing display unevenness resulting from the positional misalignment.

The display unevenness resulting from the positional misalignment is caused when the black matrix opening 41a extends off outside the pixel electrode 29. Outside the pixel electrode 29, a desired voltage is applied to the liquid crystal layer 14. In the normally white TN mode where it is "dark" when the voltage is applied and "bright" when no voltage is applied, a transparent portion outside the pixel electrode 29 is a light leak during dark display.

Figure 11:
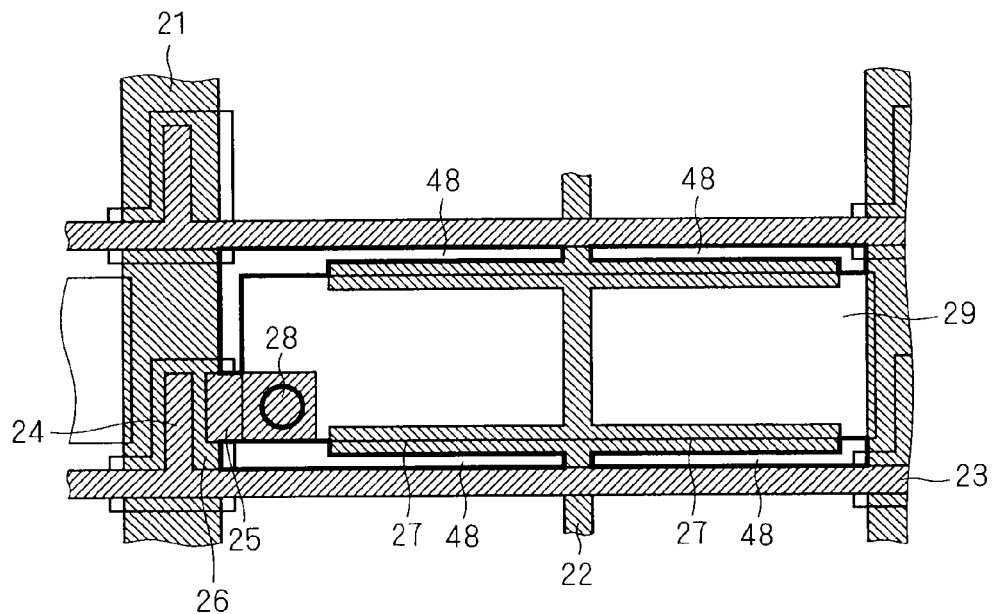
FIG. 11 is a plan view showing a structure of a pixel structure in the array substrate 12.

FIG. 11 is a plan view showing a structure of a pixel structure in the array substrate 12. In FIG. 11, an area represented by the reference sign "48" and enclosed by a thick line is the area in which the light leak occurs. Even in the normally black TN mode where dark display is given when no voltage is applied, a light leak is caused by the voltage which is applied to the scanning wire 21 and the signal wire 23, though less than in the normally white TN mode. Among the four sides i.e., upper, lower, left and right sides of the pixel electrode 29, the right side is disposed, slightly overlapping the scanning wire 21 in the adjacent pixel, specifically by about a few micron, and this avoids a light leak.

Therefore, when the black matrix opening 41a is shifted toward the adjacent scanning wire 21, specifically, rightward in FIG. 11, there occurs no light leak. Since part of the black matrix opening 41a, however, is light-shielded by the scanning wire 21, the transmittance is thereby lowered. The left side of the pixel electrode 29 does not overlap its scanning wire 21. This is for preventing the pixel electrode potential from largely varying by the voltage applied to the scanning wire 21. The variation in pixel electrode potential due to the capacitance between the pixel electrode 29 and its scanning wire 21 is called a feedthrough voltage or a kickback voltage.

The upper and lower sides of the pixel electrode 29 also do not overlap the signal wire 23. This is for suppressing an effect on a pixel electrode potential of the same row to which the image signal voltage is applied from the signal wire 23, which is produced when these sides overlap the signal wire 23, in other words, suppressing a crosstalk phenomenon.

Though the positional misalignment of the black matrix openings 41a occurs in the lateral direction of FIG. 11 since the pixel structures 11 in the liquid crystal display 10 of the first preferred embodiment are arranged with their long sides along the curve direction Y, in the first preferred embodiment, the length of the black matrix opening 41a in the curve direction Y is determined in consideration of the maximum value S of the amount of positional misalignment, to control the occurrence of light leak.

Figure 12:
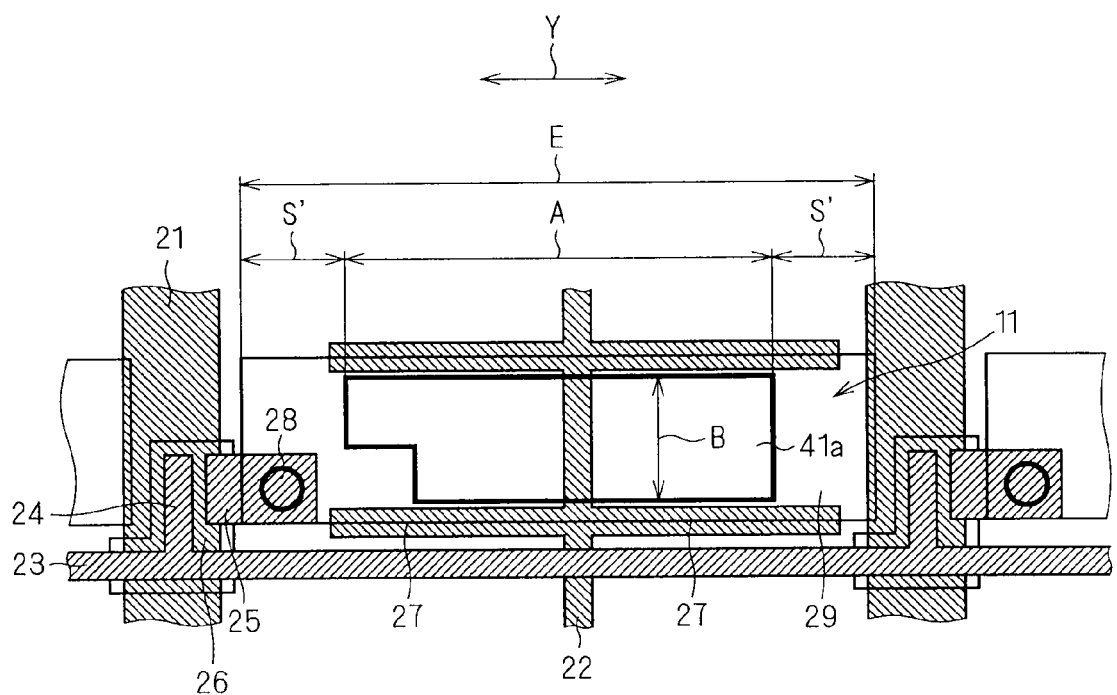
FIG. 12 is a plan view showing a black matrix opening 41a of the first preferred embodiment of the present invention.

FIG. 12 is a plan view showing the black matrix opening 41a of the first preferred embodiment of the present invention. The length A of the black matrix opening 41a in the curve direction Y is shorter than the length E of the pixel electrode 29 in the curve direction Y by not less than twice the maximum value S of the length of the positional misalignment. Thus, since the length of the black matrix opening 41a in the curve direction Y is shorter than a predetermined length in the pixel structure 11 in the liquid crystal display 10 of the first preferred embodiment, the black matrix opening 41a is always disposed inside the pixel electrode 29 regardless of the position of the display area 51. Therefore, it is possible to achieve a uniform display entirely in the display area 51.

When the liquid crystal display 10 having a curved display surface is viewed from the front, though the angle for viewing the display surface varies depending on the position of the display surface, in the constitution of the liquid crystal panel 50 of the present invention, a uniform display can be achieved entirely in the display area viewed from the front since the black matrix opening 41a is always disposed inside the pixel electrode 29 as discussed above and this makes it possible to suppress the light leak. The display surface of the liquid crystal display 10 of the present invention is curved in one direction (herein in the horizontal direction) and not curved in the other direction (herein in the vertical direction).

The black matrix opening 41a is disposed away from the light leak position between the pixel electrode 29 and its scanning wire 21 and from the boundary position with the adjacent scanning wire 21 with the same distance S'. The black matrix opening 41a has such a shape as to prevent a decrease in transmittance which is caused by exposure of the opaque drain electrode 25 from the black matrix opening 41a if the black matrix opening 41a is shifted leftward. From the viewpoint of suppressing the display unevenness, though the arrangement of the black matrix opening 41a shown in FIG. 12 is most preferable, only if the occurrence of light leak can be suppressed, the display unevenness of a low tone image is particularly improved.

Figure 13:
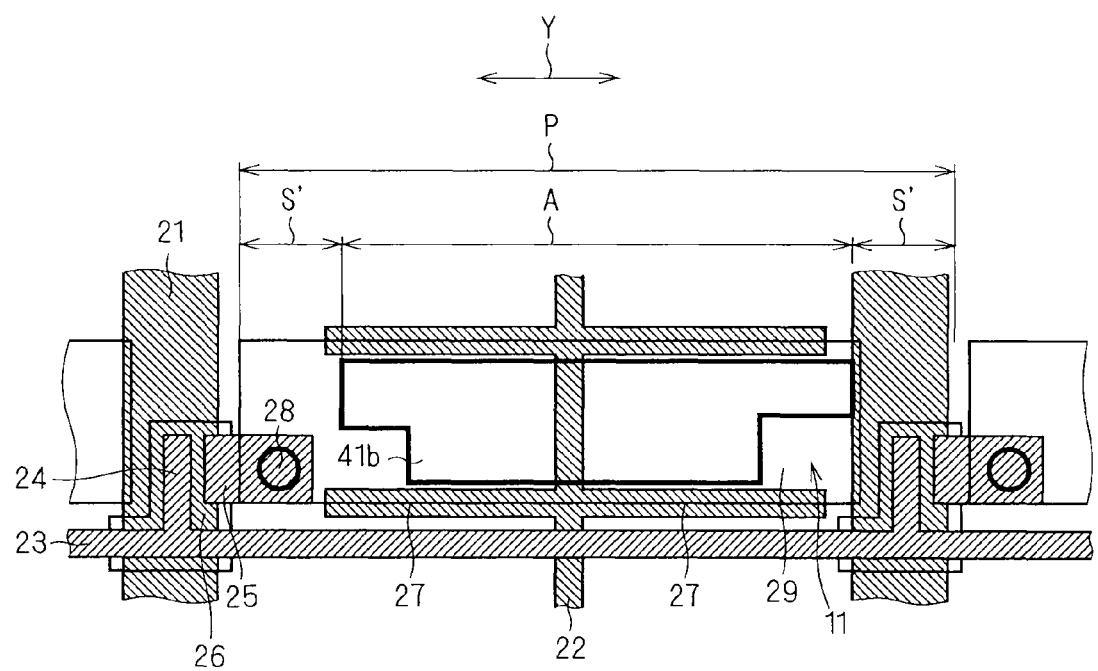
FIG. 13 is a plan view showing a black matrix opening 41b that is another example of black matrix opening.

FIG. 13 is a plan view showing a black matrix opening 41b that is another example of black matrix opening. The length A of the black matrix opening 41b shown in FIG. 13 in the curve direction Y is shorter than the pitch P of the pixel structures 11 in the curve direction Y by not less than twice the maximum value S of the length of the positional misalignment. Further, the black matrix opening 41b is disposed at a position between the pixel electrode 29 and its scanning wire 21, specifically disposed away from the light leak positions of laterally adjacent two pixels with the same distance S'.

The black matrix opening 41b has such a shape as to shield the drain electrode 25 against light and prevent exposure of the TFT switching element if the black matrix opening 41b is shifted rightward of the paper in FIG. 13. If the TFT switching element is exposed, when the TFT switching element is exposed to extraneous light, the resistance of the semiconductor layer 26, in other words, the resistance between the source electrode 24 and the drain electrode 25 decreases and this causes display unevenness. If the black matrix opening 41b has a substantial T-shape with parts of the rectangle at both ends in the longitudinal direction and at one end in the width direction being cut out as shown in FIG. 13, the occurrence of light leak can be suppressed, but if the black matrix opening 41b is shifted rightward of the paper in FIG. 13, since the opaque scanning wire 21 is exposed from the black matrix opening 41b in accordance with the amount of shift, the transmittance decreases. Therefore, when the liquid crystal panel 50 is curved in the same manner as shown in FIG. 4, there exists an area having slightly low luminance only on the right side of the display area 51.

As discussed above, by determining the length of the black matrix opening 41b, the display unevenness resulting from the positional misalignment can be resolved. As compared with the case where the black matrix opening 41b is formed in accordance with the shape of the pixel electrode 29, however, the area of the black matrix opening 41b is reduced and the transmittance decreases.

Then, in the first preferred embodiment, in order to suppress the reduction in area of the black matrix opening 41b to minimum, the long sides of the pixel structures 11 are arranged along the curve direction Y. If the short sides of the pixel structures 11 are arranged along the curve direction Y, the size B of the black matrix 41 in its width direction (see FIG. 12) is narrowed by not less than twice the maximum value S of the length of the positional misalignment and the numerical aperture significantly decreases.

Further in the first preferred embodiment, in order to suppress the decrease in transmittance to minimum, the signal wire 23 is disposed along the curve direction Y and the scanning wire 21 and the common wire 22 are disposed along the direction orthogonal to the curve direction Y. Conversely, if the scanning wire 21 and the common wire 22 are disposed along the curve direction Y, the two wires are disposed in the long side direction of the pixel structure 11 and the area ratio of the opaque wires to the pixel increases. This is not preferable.

In the first preferred embodiment, it is assumed that the size of the pixel structure 11 in its longitudinal direction is 330 µm and the size of the pixel structure 11 in its width direction is 110 µm, and 640 pixel structures are arranged in the lateral direction and 360×3 pixel structures are arranged in the lengthwise direction. The size of the display area 51 is 211 mm wide and 119 mm long (9.5 inches diagonally). The thicknesses of the glass substrates 20 and 40 in the array substrate 12 and the counter substrate 13 are each 0.15 mm. The panel gap d is 4.5 μm. In the first preferred embodiment, the surface of the counter substrate 13 is concave and curved like an arch with the radius of curvature of 500 mm. In this case, it is found from Eq. (2) that the maximum value S of the positional misalignment between the array substrate 12 and the counter substrate 13 is a little less than 33 μm. The length of the pixel electrode 29 in the curve direction Y is 310 μm and the length A of the black matrix opening 41b in the curve direction Y is 240 μm (<310−33×2 μm).

Next, discussion will be made on a method of manufacturing the liquid crystal display 10. In the first preferred embodiment, the array substrate 12 and the counter substrate 13 which have predetermined pixel structures 11 are manufactured by using two flat glass substrates each having a thickness of 0.5 mm, and after these substrates 12 and 13 are pasted together, these substrates 12 and 13 are so thinned as to have a thickness of 0.15 mm.

Figure 14:
FIG. 14 is a cross section showing a method of manufacturing the counter substrate 13.
Figure 15:
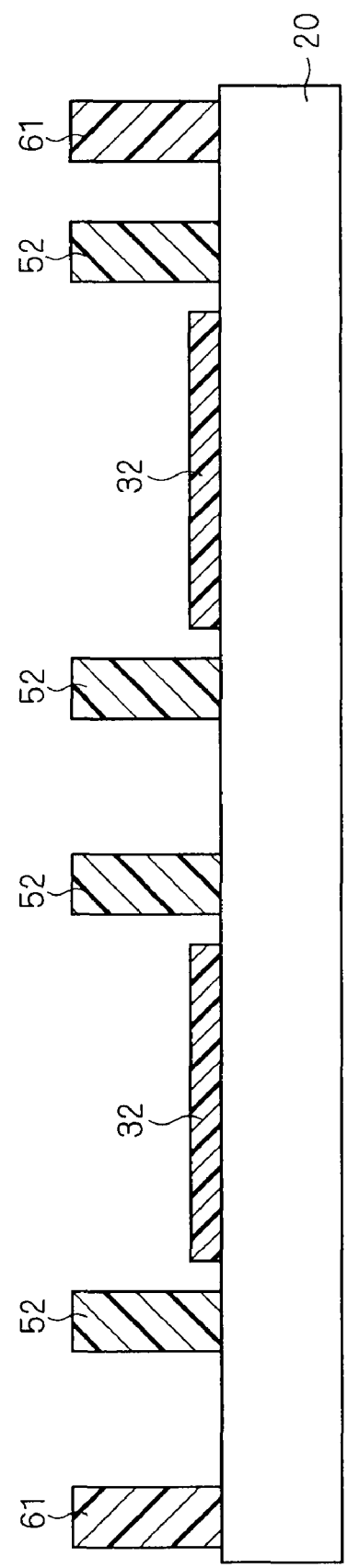
FIG. 15 is a cross section showing a method of manufacturing the array substrate 12.

FIG. 14 is a cross section showing a method of manufacturing the counter substrate 13. FIG. 15 is a cross section showing a method of manufacturing the array substrate 12. In the first preferred embodiment, four liquid crystal displays 10 are manufactured by using a pair of glass substrates. First, on the surface of the glass substrate 40, the black matrix 41 having a predetermined shape, the color filter 42, the overcoat film 43 and the counter electrode 44 are stacked in this order (see FIG. 2). On the counter electrode 44, the counter substrate-side orientation film 45 is formed and an orientation process is performed in a predetermined direction. As the counter substrate-side orientation film 45, a polymeric material such as polyimide or the like is used, and the orientation process is performed by the rubbing method where the surface of the counter substrate-side orientation films 45 is rubbed by a piece of rayon cloth or the like. After the orientation process, a spherical resin spacer agent 60 is sprayed onto the surface of the counter substrate-side orientation film 45. Herein, a spacer agent having a diameter of 4.5 μm is used.

On the surface of the array substrate 12, the wires 21, 22 and 23, the electrodes 24, 25 and 29 and the like are formed and pixels are arranged in matrix (see FIG. 2). The array substrate-side orientation film 32 is formed thereon, and an orientation process is performed in a predetermined direction. The material of the array substrate-side orientation film 32 and the method of performing the orientation process are the same as those of the counter substrate-side orientation film 45. After the orientation process, the main seal 52 is so applied as to surround the display area 51 consisting of a plurality of pixels arranged in matrix. Further, a dummy seal 61 is applied inside the outermost perimeter of the two glass substrates 20 and 40. As the main seal 52 and the dummy seal 61, a thermosetting resin such as an epoxy resin or the like is used. Subsequently, the two glass substrates 20 and 40 are pasted together so that the surface of the array substrate-side orientation film 32 and the surface of the counter substrate-side orientation film 45 are opposed to each other, and a thermal compression bonding is performed to harden the main seal 52 and the dummy seal 61.

Figure 16:
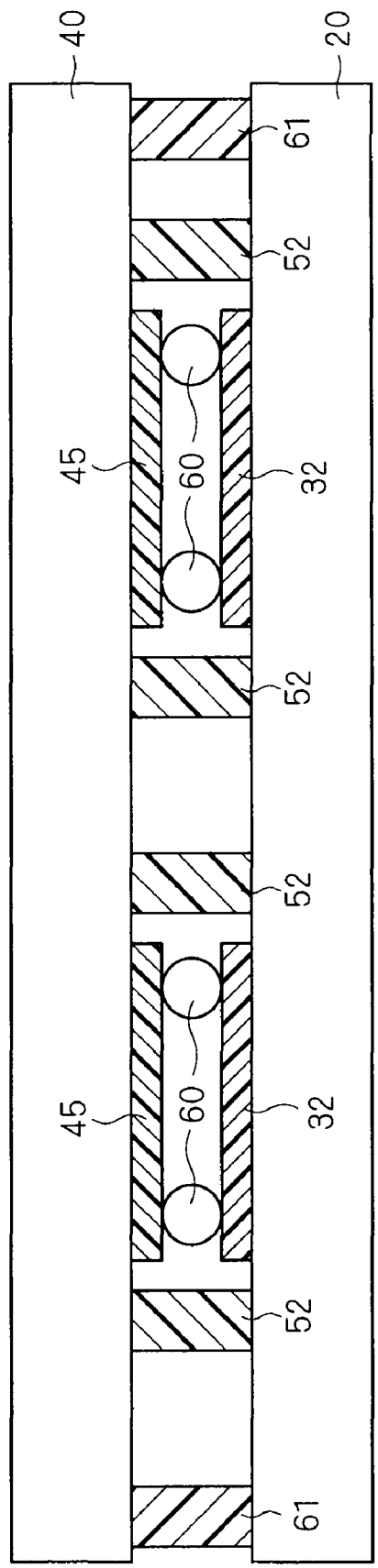
FIG. 16 is an end elevation at the section line X16-X16 of FIG. 17.
Figure 17:
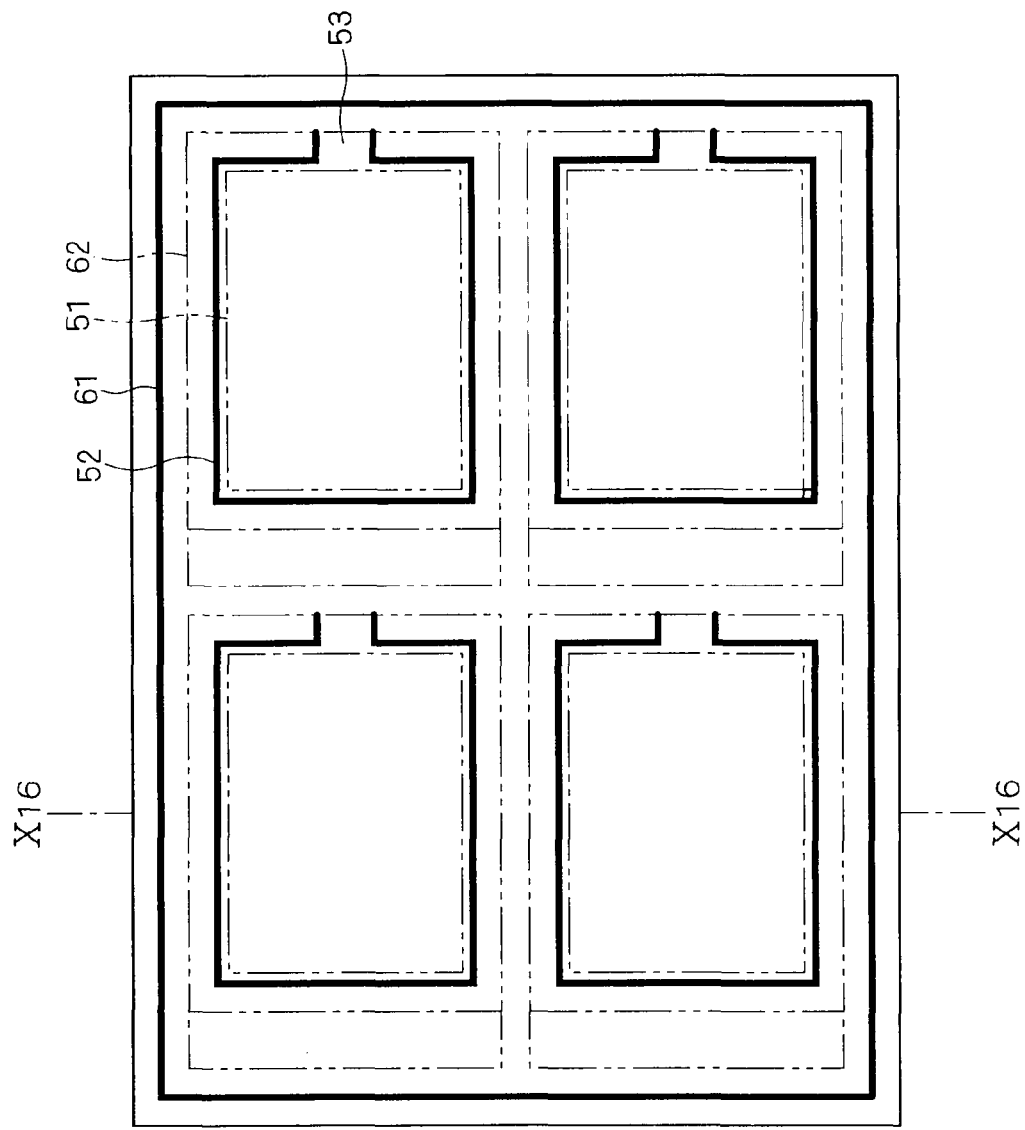
FIG. 17 is a plan view showing a main seal 52 and a dummy seal 61 on a glass substrate.

FIG. 16 is an end elevation at the section line X16-X16 of FIG. 17. FIG. 17 is a plan view showing the main seal 52 and the dummy seal 61 on the glass substrates. FIG. 16 shows the state where the two glass substrates 20 and 40 are pasted together. In the main seal 52 which is so applied as to surround the display area 51 as discussed above, provided is the liquid crystal inlet 53 which is an opening for injection of the liquid crystal. Subsequently, the two glass substrates 20 and 40 pasted together are immersed into an etching solution of hydrofluoric acid (HF) or buffered hydrofluoric acid (BHF: HF+NH4F), being etched, to be thinned. By controlling the concentration of the etching solution and the immersion time, the glass substrates 20 and 40 are each thinned to have a thickness of about 0.15 mm. It is preferable that each thickness of the glass substrates 20 and 40 ranges from 0.05 mm to 0.3 mm. If the glass substrates are too thin, the glass substrates becomes easier to break in manufacturing process steps after thinning, such as process steps of injecting the liquid crystal, pasting the polarizing plates and the like discussed later, and if the glass substrates are too thick, the glass substrates becomes harder to curve and easier to break in a step of curving it.

After the glass substrates 20 and 40 are thinned, by using a glass scriber or the like, the glass substrates are cut at a cutting position indicated by the reference sign "62" in FIG. 17 into four parts each of which is for one liquid crystal display. Further, at the side having a wiring terminal to be connected to an external image signal output part, the counter substrate 13 is cut inside the array substrate 12 on which a connection terminal is formed.

Figure 18:
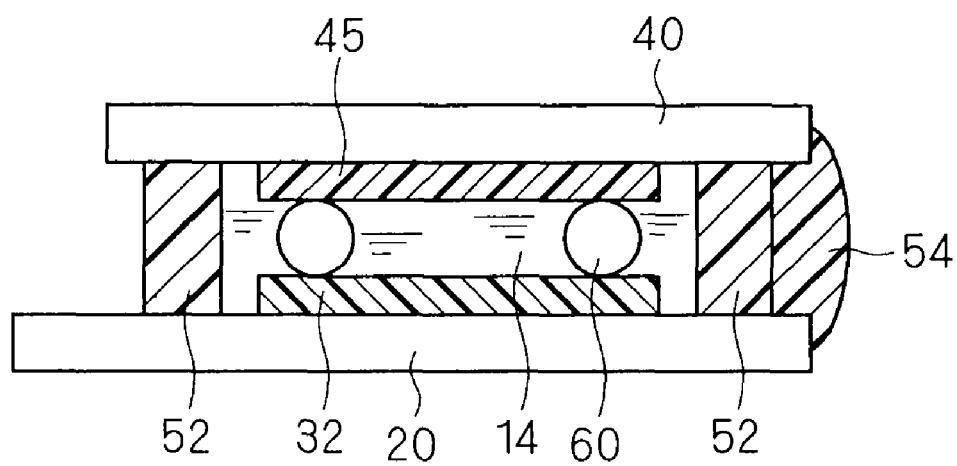
FIG. 18 is a cross section showing a structure in a state where liquid crystal is injected between two glass substrates 20 and 40.

Next, the pasted glass substrates which are cut out as discussed above and the liquid crystal are put into a vacuum vessel, being evacuated, and then the liquid crystal inlet 53 is brought into contact with the liquid crystal. When the vacuum vessel is put under atmospheric pressure again, the liquid crystal is injected from the liquid crystal inlet 53. FIG. 18 is a cross section showing a structure in a state where the liquid crystal is injected between the two glass substrates 20 and 40. Herein, a nematic liquid crystal with left-handed chirality, having positive dielectric anisotropy, is used. The birefringence of the liquid crystal ranges from 0.085 to 0.090 (at a wavelength of 589 nm). After injection of the liquid crystal, the liquid crystal inlet 53 is closed with the sealing agent 54.

Figure 19:
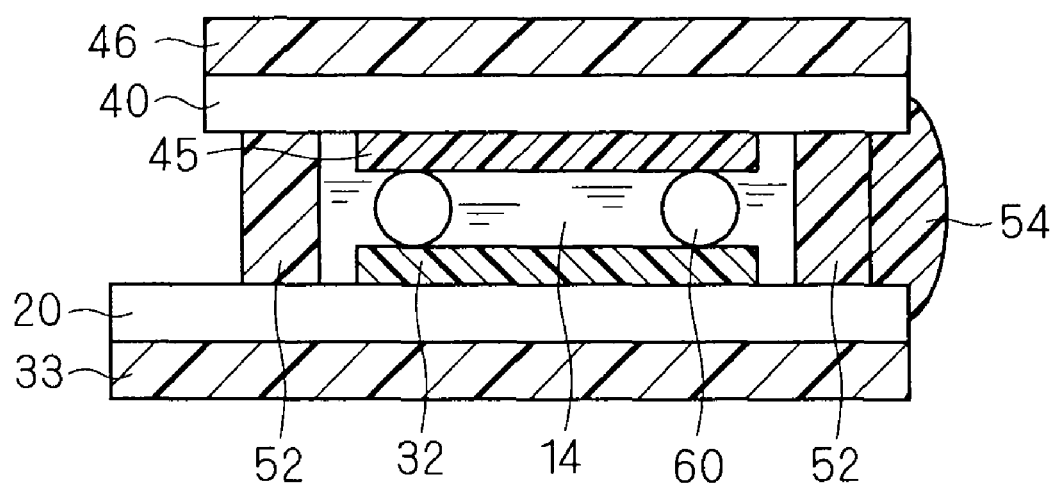
FIG. 19 is a cross section showing a structure in a state where an array substrate-side polarizing plate 33 and a counter substrate-side polarizing plate 46 are pasted to the structure of FIG. 18.

Next, the counter substrate-side polarizing plate 46 is pasted on the outer surface of the counter substrate 13, and the array substrate-side polarizing plate 33 is pasted on the outer surface of the array substrate 12. Polyvinyl alcohol (PVA) dyed with iodine is stretched and inserted between two cellulose triacetates (TAC), and this is used as the array substrate-side polarizing plate 33 and the counter substrate-side polarizing plate 46. A film-like adhesive is used for pasting the array substrate-side polarizing plate 33 and the counter substrate-side polarizing plate 46. FIG. 19 is a cross section showing a structure in a state where the array substrate-side polarizing plate 33 and the counter substrate-side polarizing plate 46 are pasted to the structure of FIG. 18. After pasting of the array substrate-side polarizing plate 33 and the counter substrate-side polarizing plate 46, the wires on the array substrate 12 are connected to the external circuit substrate 56 with the flexible substrate 55. Thus, the liquid crystal panel 50 of the liquid crystal display 10 is manufactured.

Figure 20:
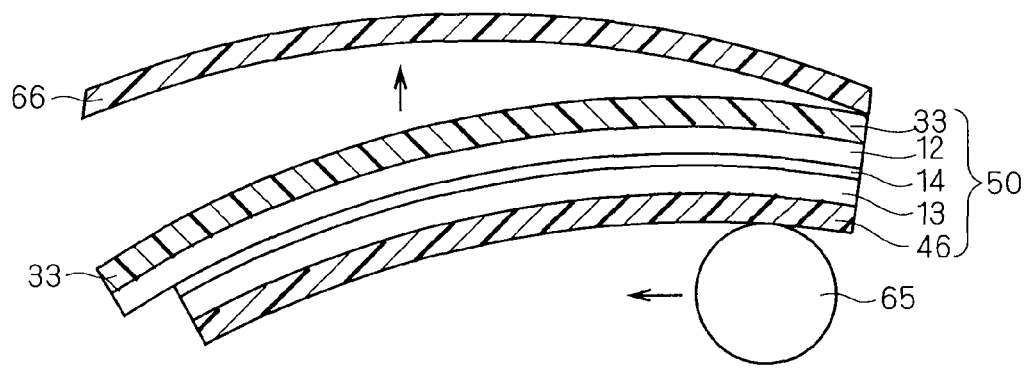
FIG. 20 is a cross section showing a structure in a state where the liquid crystal panel 50 and a support plate 66 are pasted together.

FIG. 20 is a cross section showing a structure in a state where the liquid crystal panel 50 and a support plate 66 are pasted together. As shown in FIG. 20, while the liquid crystal panel 50 is pressed against the support plate 66 with a roller 65, the liquid crystal panel 50 and the support plate 66 are pasted together by using a sheet-like adhesive film. A transparent resin such as acrylic, polycarbonate or the like is molded in a shape curved with a predetermined curvature, in other words, with a radius of curvature obtained by adding the thickness of the liquid crystal panel 50 to a radius of curvature of a desired display surface, and this is used as the support plate 66. At the end portion of the liquid crystal panel 50 in the curve direction Y, however, since the stress of the inner-side counter substrate 13 is too strong and a predetermined curvature can not be achieved as discussed above, the liquid crystal panel 50 is slightly deformed together with the whole support plate 66.

Figure 21:
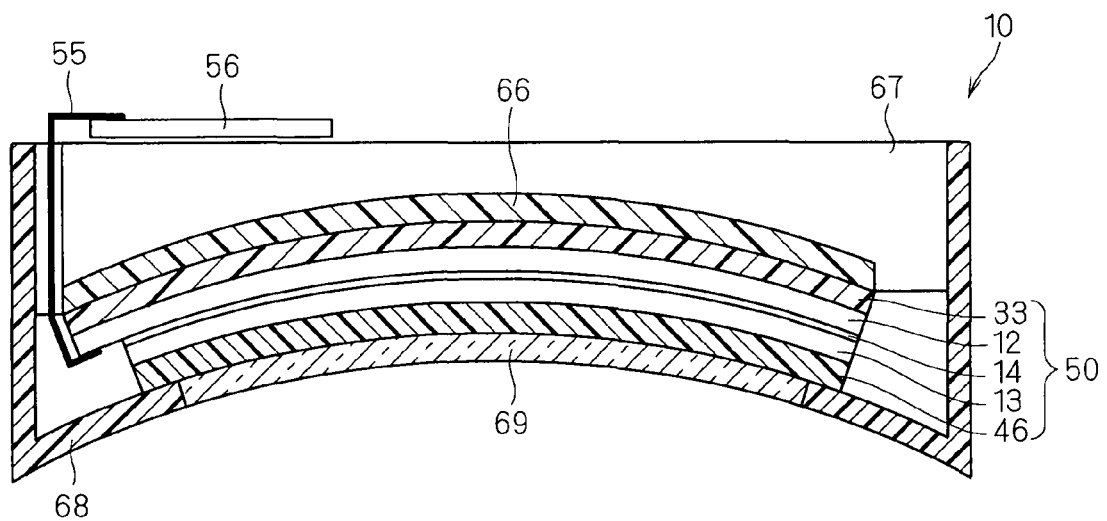
FIG. 21 is a cross section showing a structure of the liquid crystal display 10 in a horizontal direction.
Figure 22:
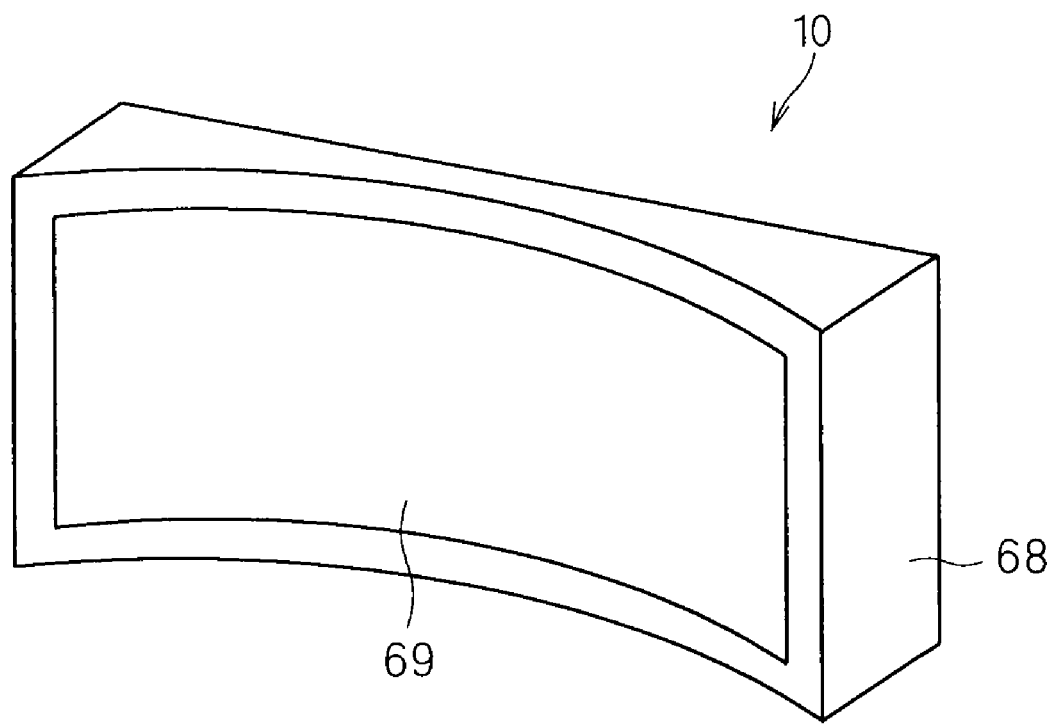
FIG. 22 is a perspective view simply showing the structure of the liquid crystal display 10 in the horizontal direction.

FIG. 21 is a cross section showing a structure of the liquid crystal display 10 in the horizontal direction. FIG. 22 is a perspective view simply showing the structure of the liquid crystal display 10 in the horizontal direction. The liquid crystal panel 50 and the support plate 66 which are curved as discussed above are stacked on the backlight 67, and an enclosure 68 further covers this structure from the side of the counter substrate 13, to complete the liquid crystal display 10. The backlight 67 has a stacked structure, like a backlight of the conventionally well-known liquid crystal display, consisting of a reflection sheet, a light guide board, a diffusion sheet and a lamp. A transparent protection plate 69 is disposed on a portion which corresponds to a display surface of the enclosure 68.

The liquid crystal display 10 of the first preferred embodiment is designed so that the long sides of the pixel structures 11 are arranged along the curve direction Y and assuming that the length of the display surface in the curve direction Y is L, the thickness of the array substrate 12 is T1, the thickness of the counter substrate 13 is T2, the size of the gap between the array substrate 12 and the counter substrate 13 is d, the radius of curvature of the curved display surface is R and the length of the long side of the pixel electrode 29 provided in the pixel structure is E, the length of the black matrix opening 41a which is an opening sectioned by the black matrix 41 in the curve direction is not longer than $E-L\{(T1/2)+(T2/2)+d\}/R$.

Thus, since the length of the black matrix opening 41a in the curve direction Y is not longer than $E-L\{(T1/2)+(T2/2)+d\}/R$, it is possible to suppress the light leak occurring around the pixel electrode 29 provided in the pixel structure and then suppress the display unevenness resulting from the positional misalignment between the array substrate 12 and the counter substrate 13 due to the curvature. Further, since the pixel structures 11 are arranged with their long sides along the curve direction Y of the display surface, it is possible to suppress a decrease in luminance due to the setting of the length of the black matrix opening 41a in the curve direction Y to be not longer than $E-L\{(T1/2)+(T2/2)+d\}/R$, as compared with a case where the pixel structures 11 are arranged with their short sides along the curve direction Y. Therefore, it is possible to provide a liquid crystal display 10 achieving a high-quality image display with less display unevenness and high luminance.

Further, in the case of adopting the black matrix opening 41b shown in FIG. 13, the length of the black matrix opening 41b in the curve direction Y is determined not longer than $P-L\{(T1/2)+(T2/2)+d\}/R$. This makes it possible to suppress the light leak occurring around the pixel electrode 29 provided in the pixel structure 11 and then suppress the display unevenness resulting from the positional misalignment between the array substrate 12 and the counter substrate 13 due to the curvature. Further, as discussed above, since the pixel structures 11 are arranged with their long sides along the curve direction Y of the display surface, it is possible to suppress a decrease in luminance due to the setting of the length of the black matrix opening 41b in the curve direction Y to be not longer than $P-L\{(T1/2)+(T2/2)+d\}/R$, as compared with the case where the pixel structures 11 are arranged with their short sides along the curve direction Y. Therefore, it is possible to provide a liquid crystal display 10 achieving a high-quality image display with less display unevenness and high luminance.

Furthermore, in the first preferred embodiment, since the liquid crystal layer 14 is in the twisted nematic mode of 12 o'clock viewing angle and the curve direction Y is the horizontal direction of the display surface, it is possible to provide a liquid crystal display 10 achieving an easy-to-view image display with less variation in luminance entirely in the curve direction Y as viewed from the front. Though it is not the present preferred embodiment, also when the liquid crystal layer 14 is in the twisted nematic mode of 6 o'clock viewing angle, it is possible to provide a liquid crystal display 10 achieving an easy-to-view image display with less variation in luminance entirely in the curve direction Y as viewed from the front, like in the present preferred embodiment.

Still further, in the liquid crystal display 10 of the first preferred embodiment, the signal wire 23 is disposed along the curve direction Y and the scanning wire 21 and the common wire 22 are disposed in the direction orthogonal to the curve direction Y. Since the long sides of the pixel structures 11 are arranged along the curve direction Y, the signal wire 23 is disposed along the long sides of the pixel structures 11 and the scanning wire 21 and the common wire 22 are disposed along the short sides of the pixel structures 11. It is thereby possible to reduce the ratio of the area to the pixel structure 11, which is occupied by the opaque wire, that is to say, the wire having no transparency in the direction of a short side which is relatively small side of four sides constituting the pixel structures 11, as compared with a case where the scanning wire 21 and the common wire 22 are disposed along the long sides of the pixel structures 11 and the signal wire 23 is disposed along the short sides of the pixel structures 11. Therefore, since this allows high numerical aperture, it is possible to provide a liquid crystal display 10 achieving a bright image display with high luminance.

The Second Preferred Embodiment

Next, discussion will be made on a liquid crystal display of the second preferred embodiment of the present invention. In the above-discussed first preferred embodiment, the liquid crystal display 10 having the display surface curved concavely has been discussed. In the second preferred embodiment, a liquid crystal display having a display surface curved convexly will be discussed. In the liquid crystal display of the second preferred embodiment, constitutions of the pixel structure and the liquid crystal panel 50 before being curved are the same as those in the liquid crystal display 10 of the above-discussed first preferred embodiment. Therefore, description will be made only on constituent elements different from those in the liquid crystal display 10 and the corresponding elements are represented by the same reference signs and discussion thereof will be omitted.

Figure 23:
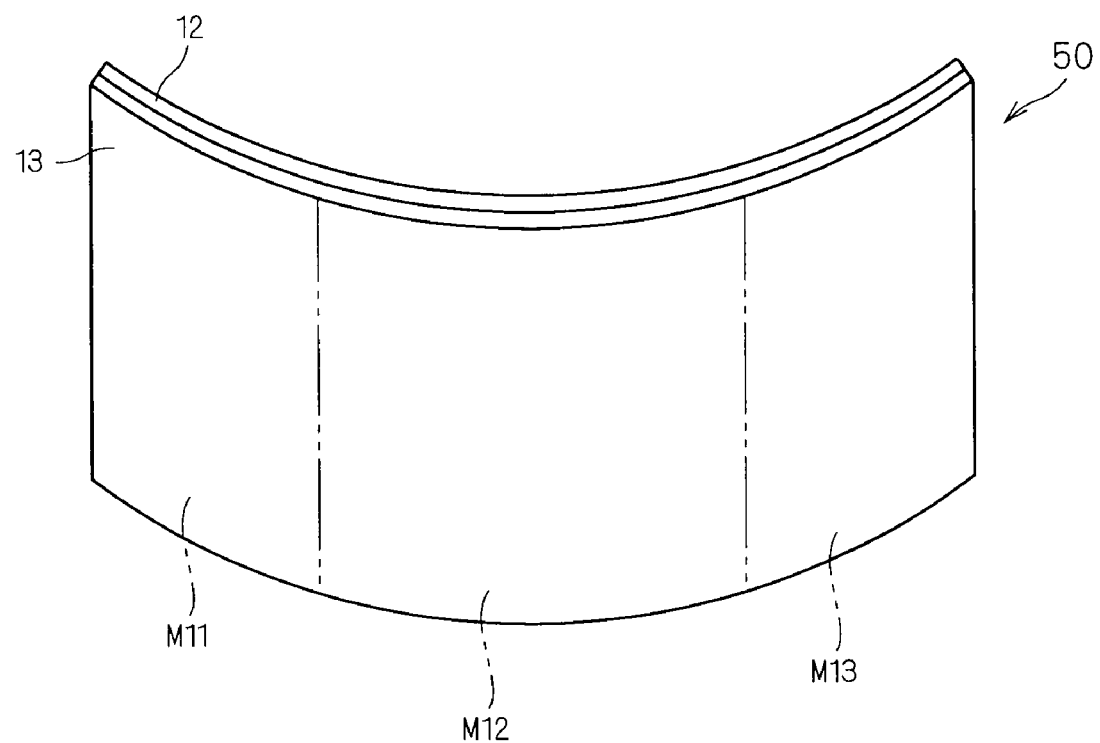
FIG. 23 is a perspective view showing the liquid crystal panel 50 with its display surface being curved convexly.
Figure 24:
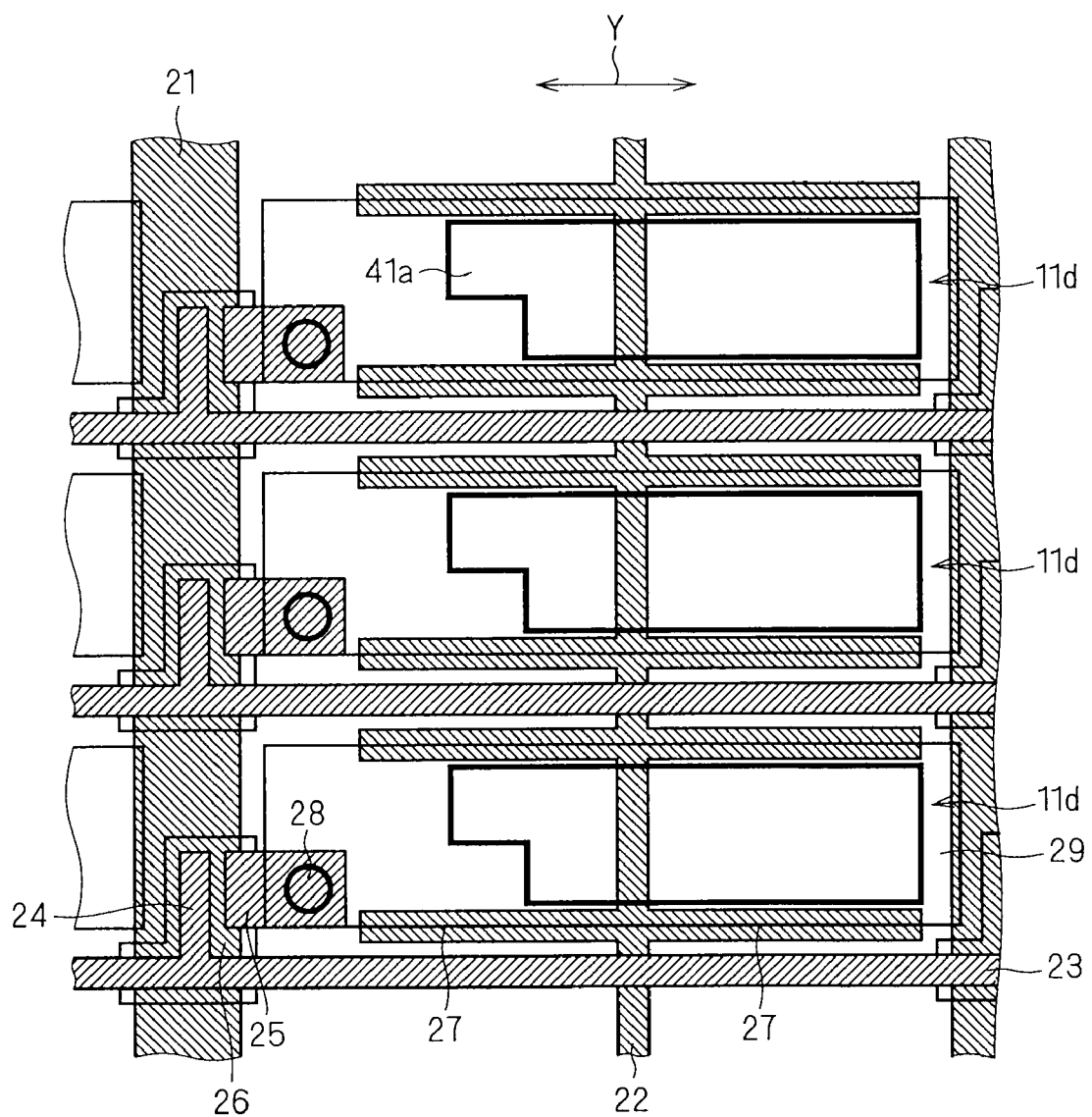
FIG. 24 is a plan view showing pixel structures 11d in a first display area M11 of the liquid crystal panel 50.
Figure 26:
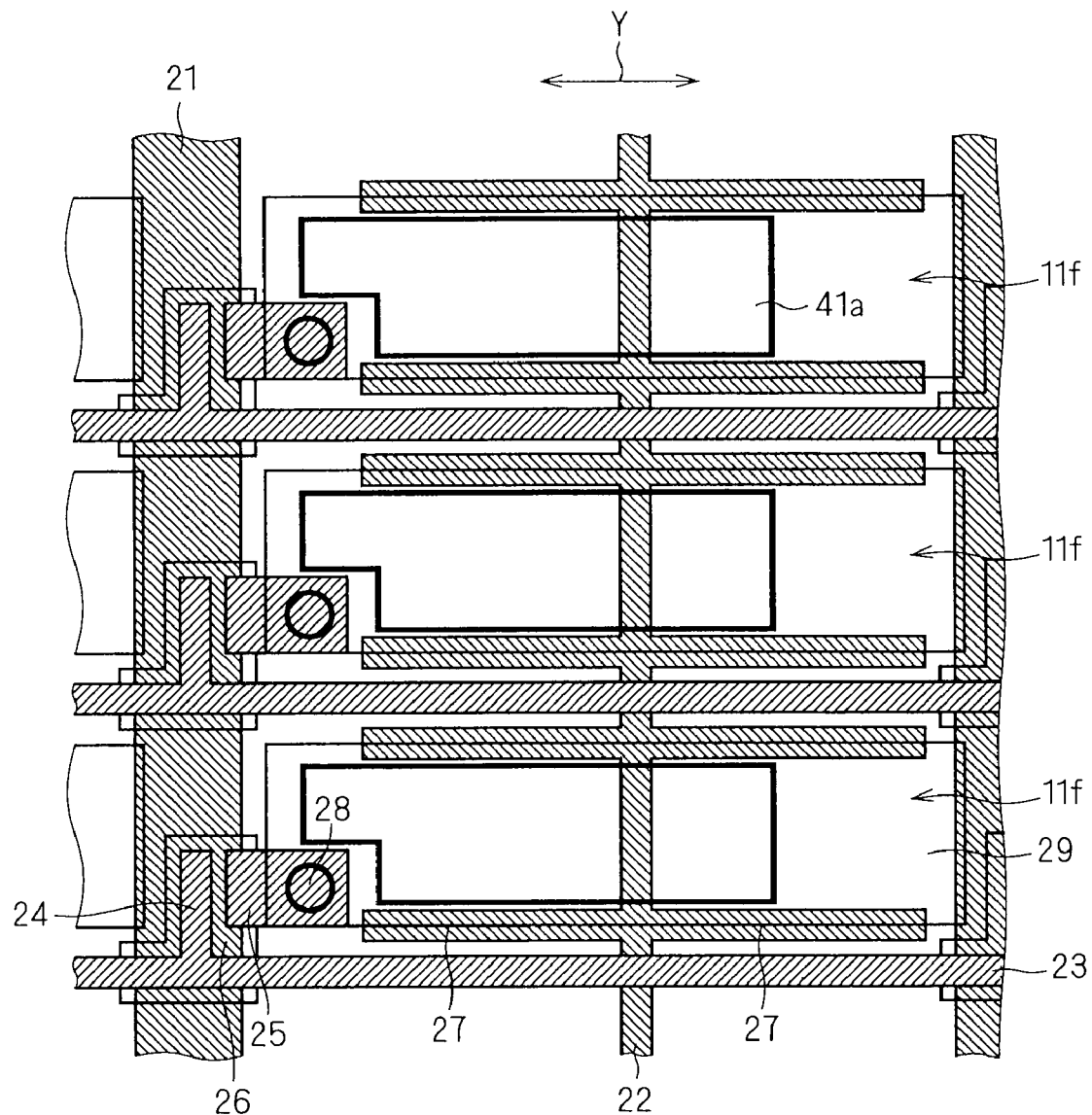
FIG. 26 is a plan view showing pixel structures 11f in a third display area M13 of the liquid crystal panel 50.

FIG. 23 is a perspective view showing the liquid crystal panel 50 with its display surface being curved convexly. FIG. 24 is a plan view showing pixel structures 11d in a first display area M11 of the liquid crystal panel 50. FIG. 25 is a plan view showing pixel structures 11e in a second display area M12 of the liquid crystal panel 50. FIG. 26 is a plan view showing pixel structures 11f in a third display area M13 of the liquid crystal panel 50. FIG. 23 schematically shows the liquid crystal panel 50 only with the two substrates, i.e., the array substrate 12 and the counter substrate 13.

Like in the case of FIG. 4 where the liquid crystal panel 50 is curved concavely, the second display area M12 of the liquid crystal panel 50 is around the center portion of the display area, and as to the pixel structures 11e of the second display area M12, as shown in FIG. 25, the positional relation between those of the array substrate 12 and the counter substrate 13 is maintained, as it is when the display surface is flat, not being curved.

The first display area M11 and the third display area M13 of the liquid crystal panel 50 are areas on both ends of the display area, and as to the pixel structures 11*d* and 11*f* of the first and third display areas M11 and M13, as shown in FIGS. 24 and 26, the pixel structures of the counter substrate 13 are deviated inside in the lateral direction. In other words, the direction of deviation is reversed as compared with the case of concave curvature.

Since the length of the black matrix opening 41*a* in the curve direction Y is shorter than a predetermined length in the pixel structures 11*d*, 11*e* and 11*f* in the liquid crystal panel 50 of the second preferred embodiment, the black matrix opening 41*a* is always disposed inside the pixel electrode 29 regardless of the position of the display area 51. Therefore, it is possible to achieve a uniform display entirely in the display area 51, like in the case where the display surface is curved concavely.

Figure 27:
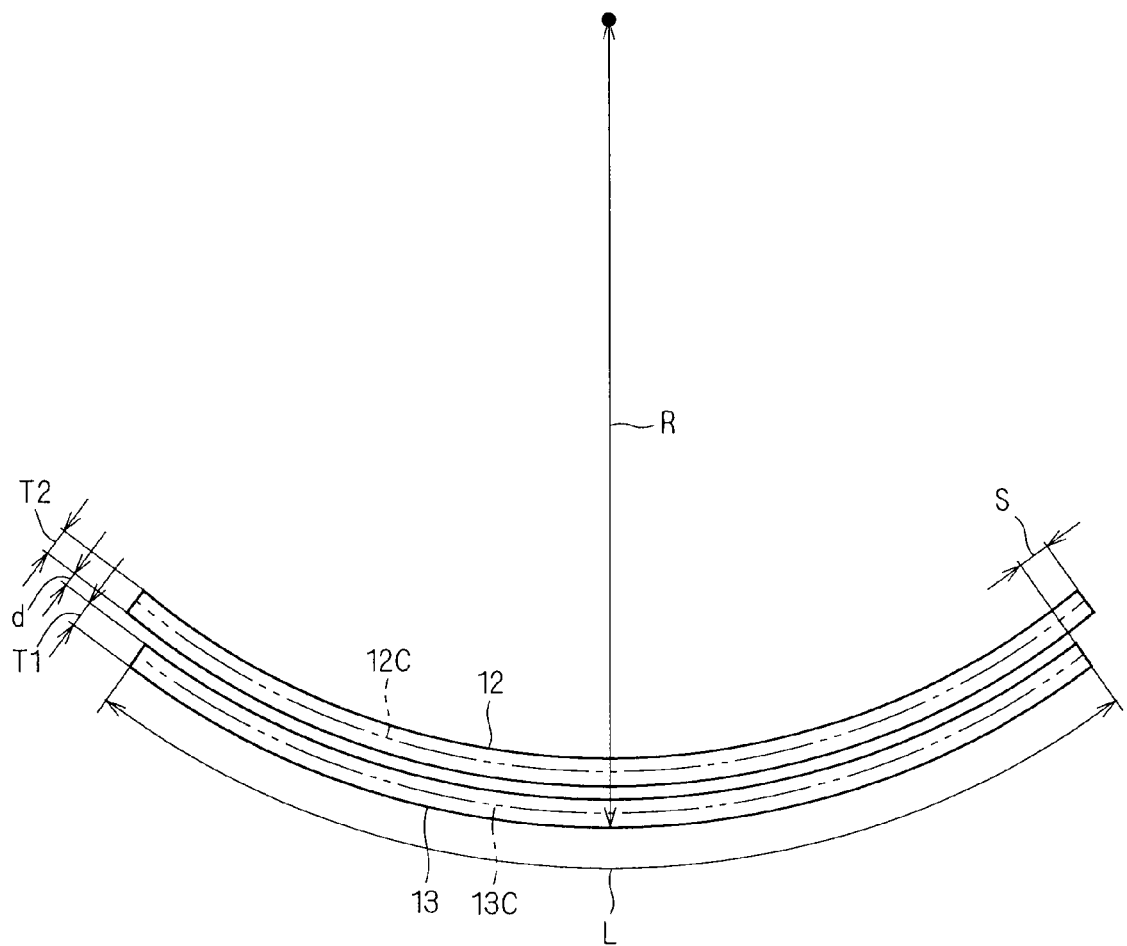
FIG. 27 is a cross section viewed from the plane of the array substrate 12 and the counter substrate 13 along the curve direction Y as the liquid crystal panel 50 is curved.

FIG. 27 is a cross section viewed from the plane of the array substrate 12 and the counter substrate 13 along the curve direction Y as the liquid crystal panel 50 is curved. FIG. 27 shows positional misalignment caused when the array substrate 12 and the counter substrate 13 are curved convexly. Since the radius of curvature is determined by the surface of the counter substrate 13 which is an outermost surface when the display surface is curved convexly as shown in FIG. 27, the maximum value of the positional misalignment in the case where the display surface is curved convexly is expressed by Eq. (3) a little different from Eq. (1).

$$S = \frac{L\left(\frac{T1}{2} + \frac{T2}{2} + d\right)}{2\left(R - T1 - \frac{T2}{2} - d\right)} \quad \text{(Eq. 3)}$$

Since the thickness T1 of the counter substrate 13, the thickness T2 of the array substrate 12, the panel gap d are each so much smaller than the radius of curvature R, the maximum value S of the positional misalignment is expressed by the above-discussed Eq. (2) like in the case of concave curvature.

Therefore, like in the above-discussed firs preferred embodiment, by setting the length of the black matrix opening 41*a* in the curve direction Y to be not longer than E–L{(T1/2)+(T2/2)+d}/R, it is possible to suppress the light leak occurring around the pixel electrode 29 provided in the pixel structure and then suppress the display unevenness resulting from the positional misalignment between the array substrate 12 and the counter substrate 13 due to the curvature. Further, since the pixel structures 11 are arranged with their long sides along the curve direction Y of the display surface, it is possible to suppress a decrease in luminance due to the setting of the length of the black matrix opening 41*a* in the curve direction Y to be in the above range, as compared with the case where the pixel structures 11 are arranged with their short sides along the curve direction Y. Therefore, it is possible to provide a liquid crystal display achieving a high-quality image display with less display unevenness and high luminance.

The Third Preferred Embodiment

Next, discussion will be made on a liquid crystal display of the third preferred embodiment of the present invention. In the third preferred embodiment, a case where the display surface is curved in a lengthwise direction as the liquid crystal display is viewed from the front will be discussed. The constitution of the liquid crystal display of the third preferred embodiment is similar to the above-discussed liquid crystal display 10 of the first preferred embodiment. Therefore, description will be made only on constituent elements different from those in the liquid crystal display 10 and the corresponding elements are represented by the same reference signs and discussion thereof will be omitted.

Figure 28:
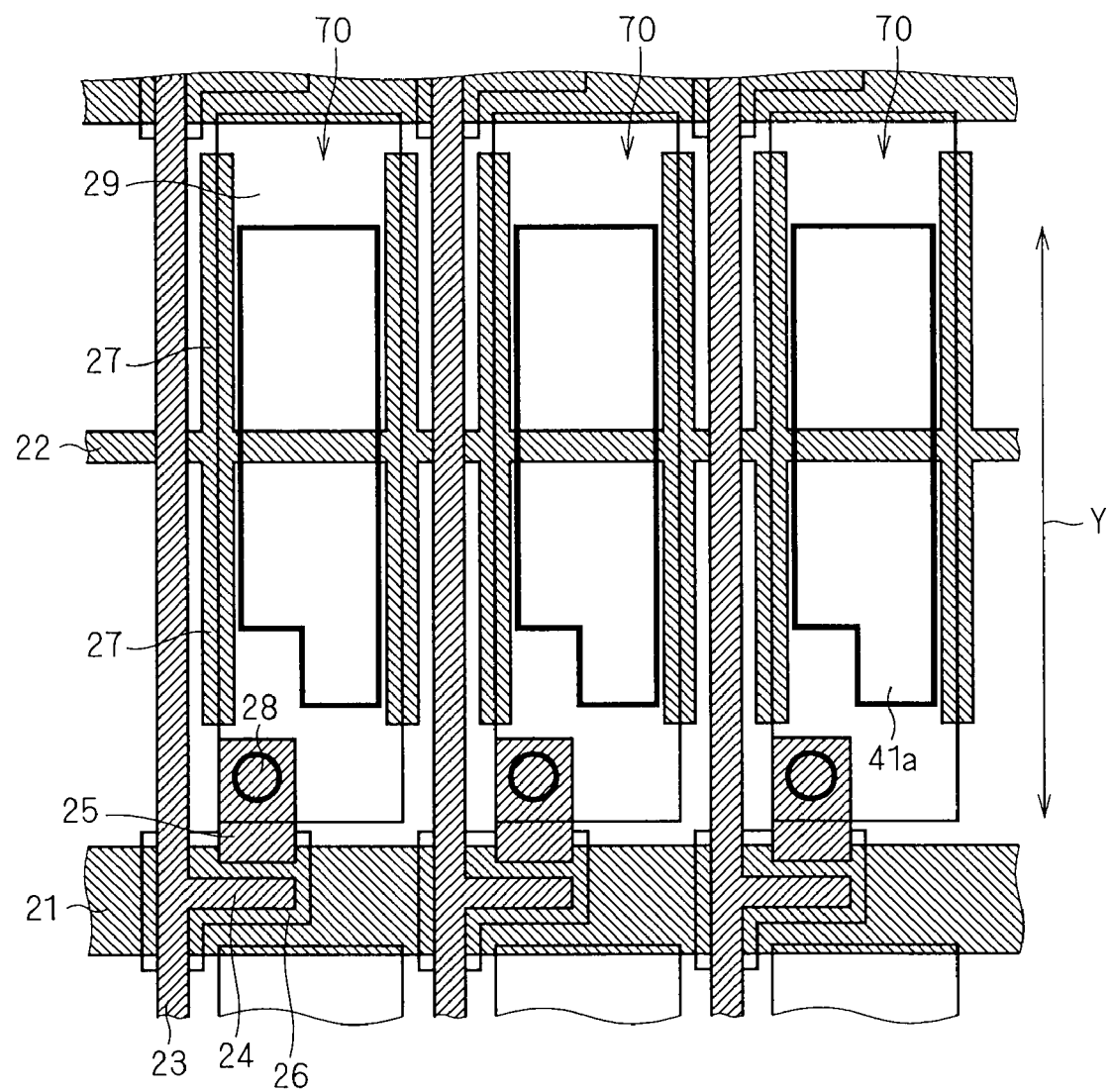
FIG. 28 is a plan view showing pixel structures 70 in a liquid crystal display of a third preferred embodiment of the present invention.

FIG. 28 is a plan view showing pixel structures 70 in the liquid crystal display of the third preferred embodiment of the present invention. Each of the pixel structures 70 has a rectangular shape extending in the lengthwise direction since the curve direction Y is the lengthwise direction. The size of the pixel structure 70 in its width direction (lateral direction) is 110 μm and the size in its longitudinal direction (lengthwise direction) is 330 μm. The length of the pixel electrode 29 in the curve direction Y is 310 μm, like in the first and second preferred embodiments. 360×3 pixels are arranged in the lateral direction and 640 pixels are arranged in the lengthwise direction. The size of the display area 51 is 119 mm wide and 211 mm long (9.5 inches diagonally). The thicknesses of the glass substrates in the array substrate 12 and the counter substrate 13 are each 0.15 mm. The panel gap d is 4.5 μm.

In the third preferred embodiment, the surface of the counter substrate 13 is convex and curved like an arch with the radius of curvature of 500 mm. In this case, the maximum value S of the positional misalignment between the array substrate 12 and the counter substrate 13 is a little less than 33 μm, from Eq. (2). Therefore, the length of the black matrix opening 41*b* in the curve direction Y is 240 μm (<310–33×2 μm).

Figure 29:
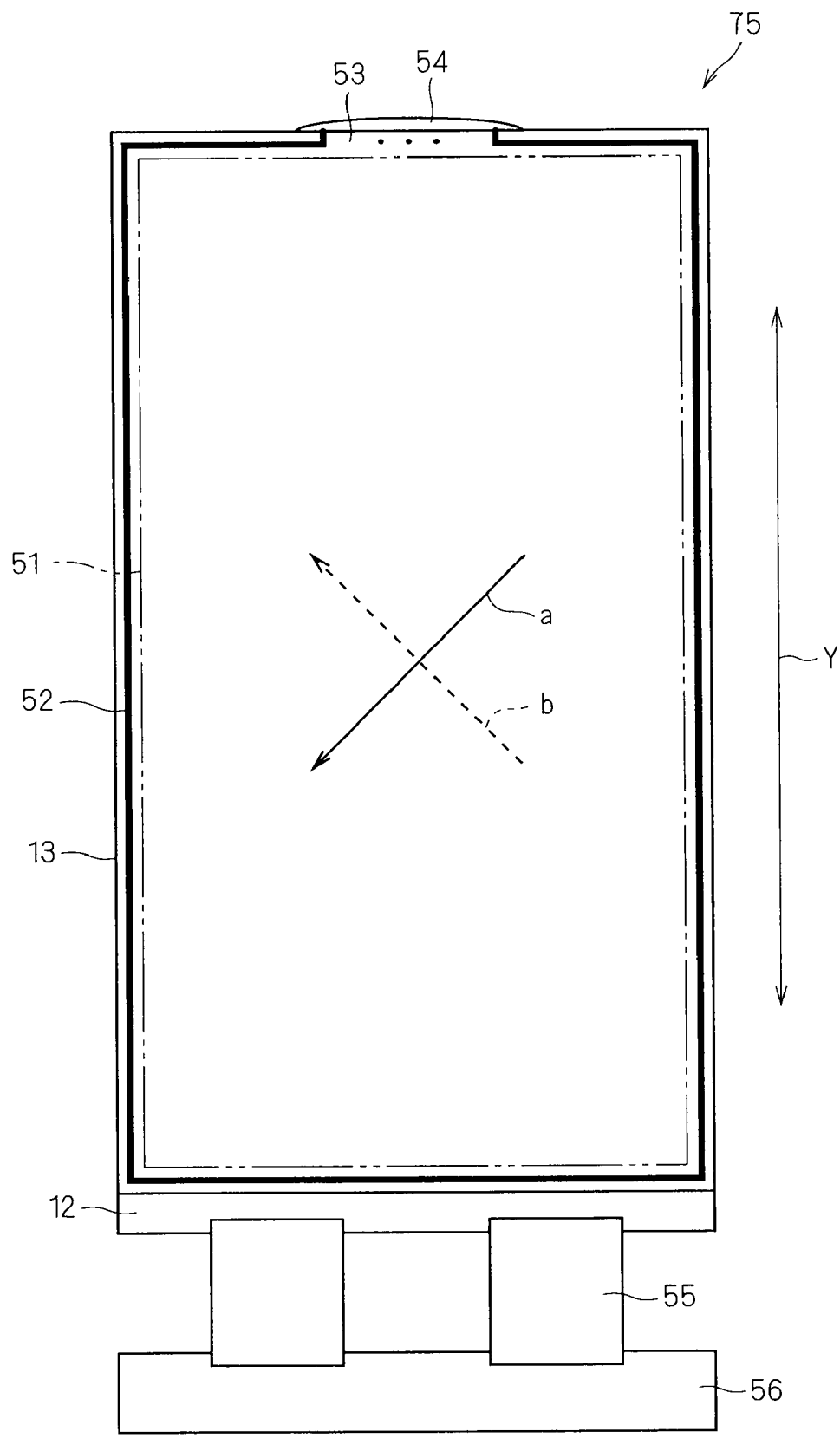
FIG. 29 is a plan view showing a structure of a liquid crystal panel 75 of the liquid crystal display before being curved.
Figure 30:
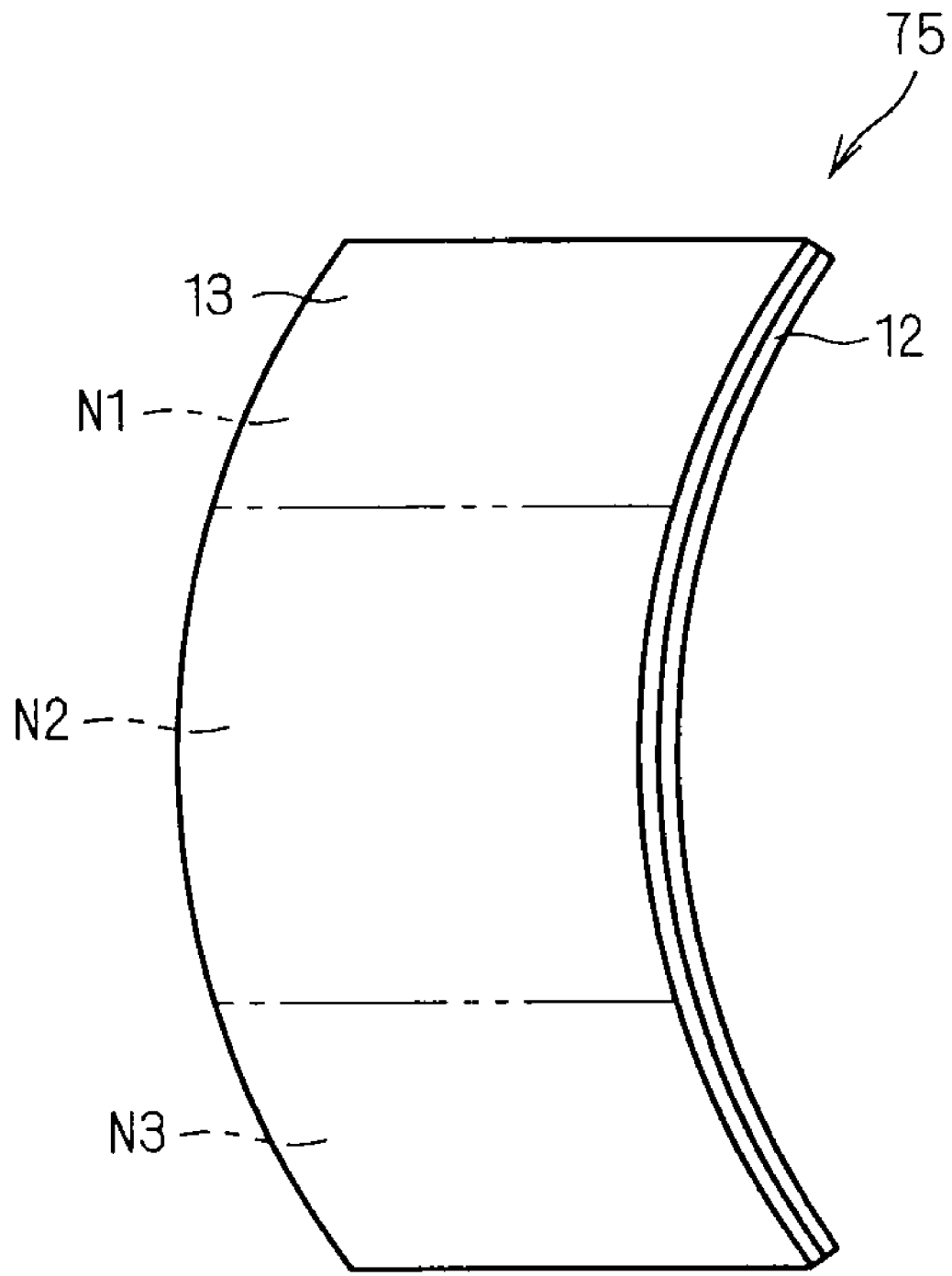
FIG. 30 is a perspective view showing the liquid crystal panel 75 with its display surface being curved convexly.
Figure 31:
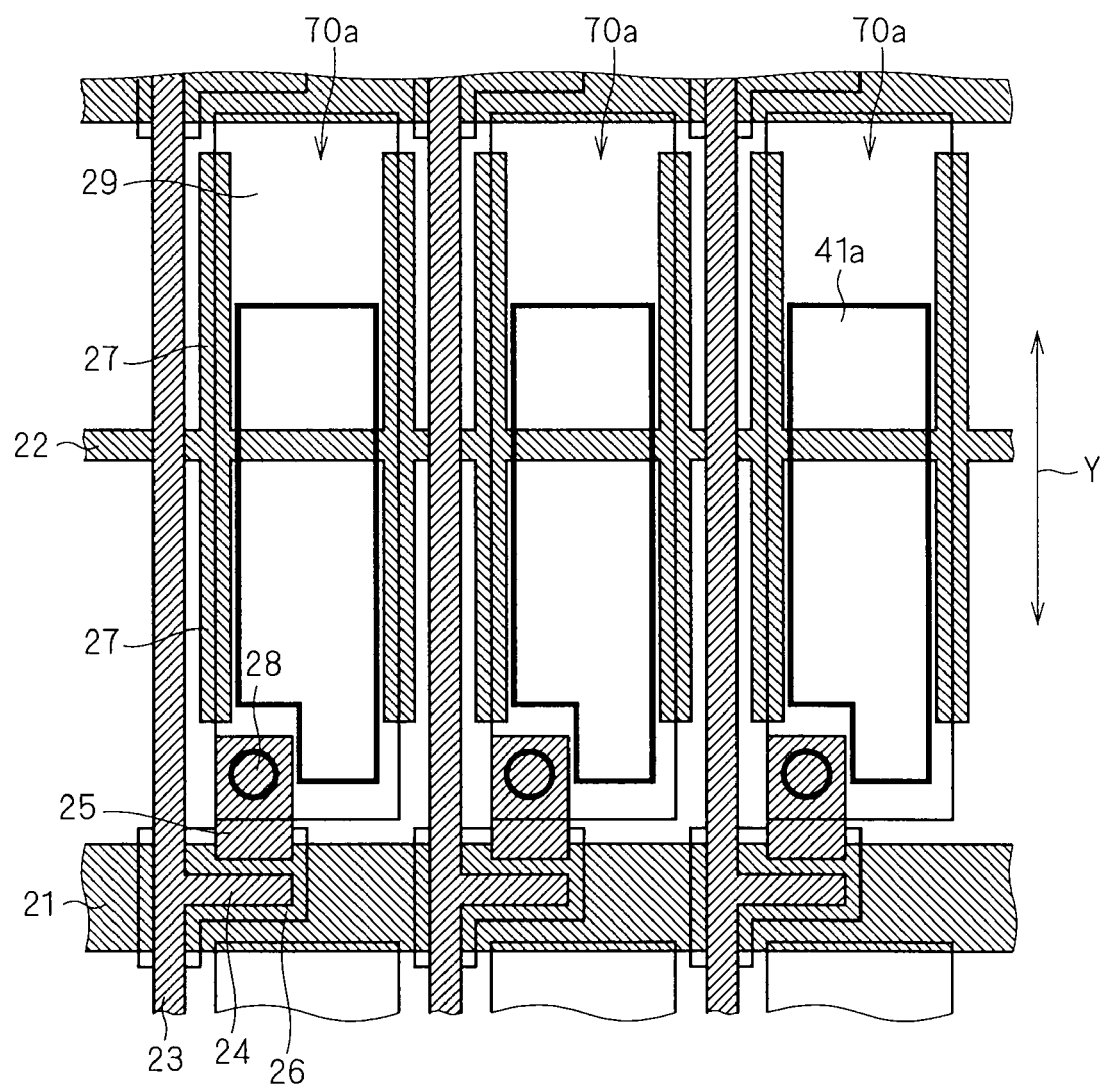
FIG. 31 is a plan view showing pixel structures 70a in a first display area N1 of the liquid crystal panel 75.
Figure 32:
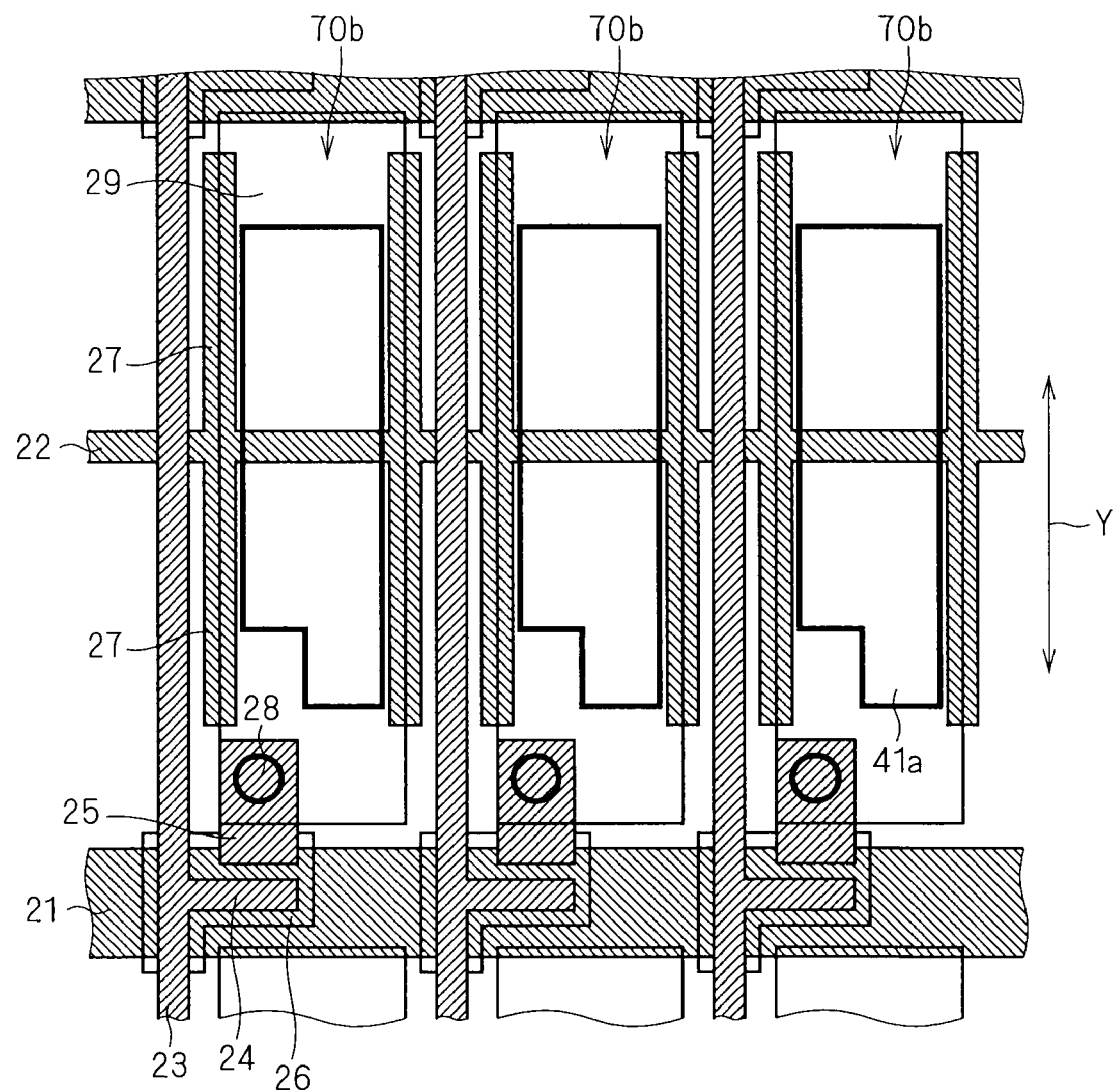
FIG. 32 is a plan view showing pixel structures 70b in a second display area N2 of the liquid crystal panel 75.
Figure 33:
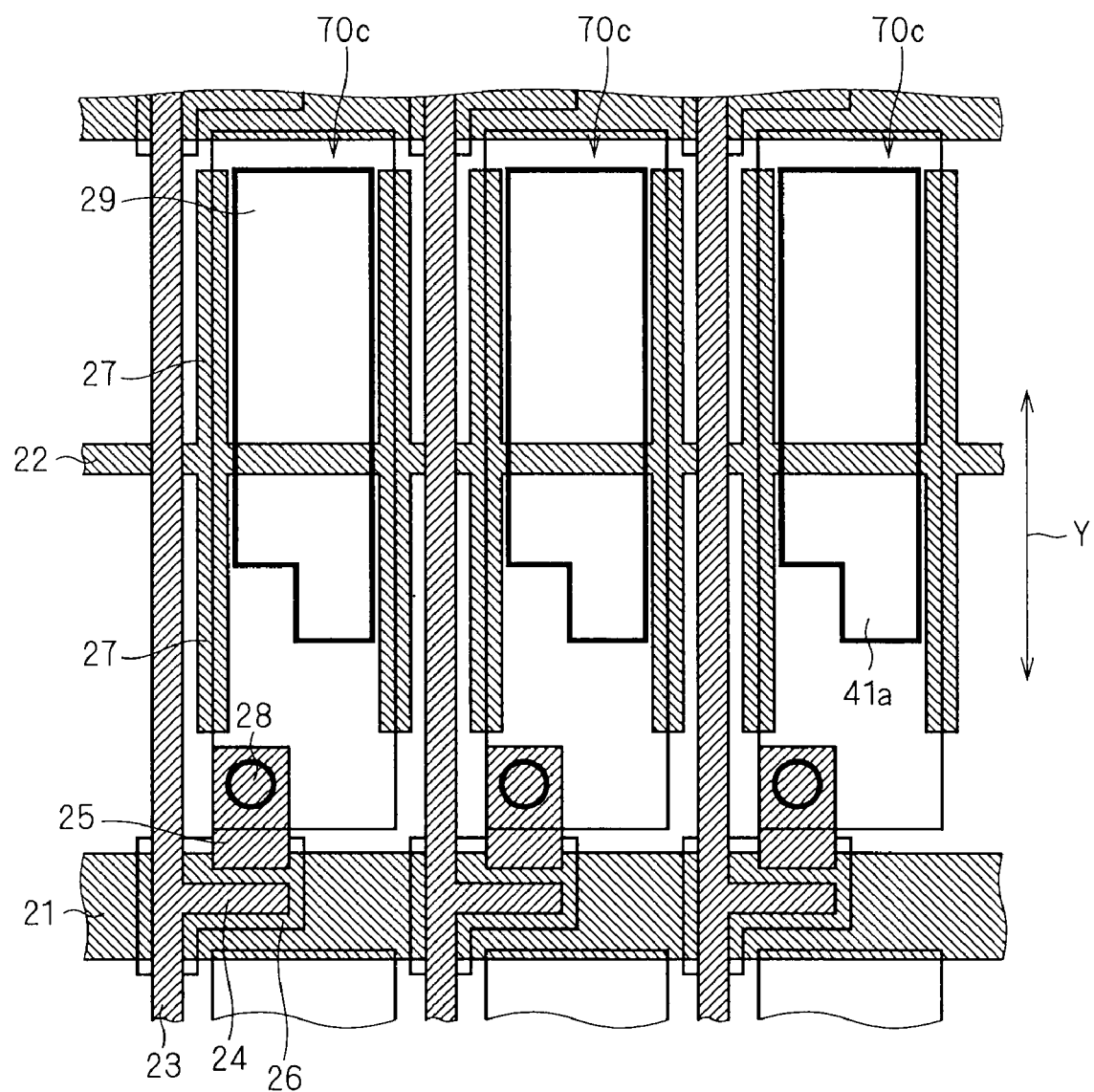
FIG. 33 is a plan view showing pixel structures 70c in a third display area N3 of the liquid crystal panel 75.

FIG. 29 is a plan view showing a structure of a liquid crystal panel 75 of the liquid crystal display before being curved. In the third preferred embodiment, like in the first and second preferred embodiments, it is in the TN mode of 12 o'clock viewing angle. FIG. 30 is a perspective view showing the liquid crystal panel 75 with its display surface being curved convexly. FIG. 31 is a plan view showing pixel structures 70*a* in a first display area N1 of the liquid crystal panel 75. FIG. 32 is a plan view showing pixel structures 70*b* in a second display area N2 of the liquid crystal panel 75. FIG. 33 is a plan view showing pixel structures 70*c* in a third display area N3 of the liquid crystal panel 75.

FIG. 30 schematically shows the liquid crystal panel 75 only with the array substrate 12 and the counter substrate 13. The second display area N2 of the liquid crystal panel 75 is around the center portion of the display area, and as to the pixel structures 70*b* of the second display area N2, as shown in FIG. 32, the positional relation between those of the array substrate 12 and the counter substrate 13 is maintained, as it is when the display surface is flat, not being curved.

The first display area N1 and the third display area N3 of the liquid crystal panel 75 are areas on both ends of the display area, and as to the pixel structures 70*a* and 70*c* of the first and third display areas N1 and N3, as shown in FIGS. 31 and 33, the pixel structures of the counter substrate 13 are deviated inside in the vertical direction.

Since the length of the black matrix opening 41*a* in the curve direction Y is shorter than a predetermined length in the pixel structures 70*a*, 70*b* and 70*c* in the liquid crystal panel 75 of the third preferred embodiment, the black matrix opening 41*a* is always disposed inside the pixel electrode 29 regardless of the position of the display area 51. Therefore, it is possible to achieve a uniform display entirely in the display area 51, like in the case where the display surface is curved concavely.

When the liquid crystal display of the third preferred embodiment is viewed from the front, however, a lower portion of the display area 51 is viewed from a slightly upper direction relative to the surface of the liquid crystal panel 75. Since this direction is a direction in which the tone inversion phenomenon of the TN mode of 12 o'clock viewing angle occurs, the luminance in bright display is slightly darker and the luminance in dark display is slightly brighter as compared with the center portion and the upper portion of the display area 51.

In the above preferred embodiments, the case where the entire display surface of the liquid crystal display is curved with the same curvature in a specific direction. Even in other cases where part of the display surface is curved, where the display surface is curved with different curvatures and where the display surface is curved concavely and convexly, the effect of suppressing the light leak can be produced by determining the shape of the black matrix opening 41a in consideration of the maximum value of the amount of positional misalignment.

Figure 34:
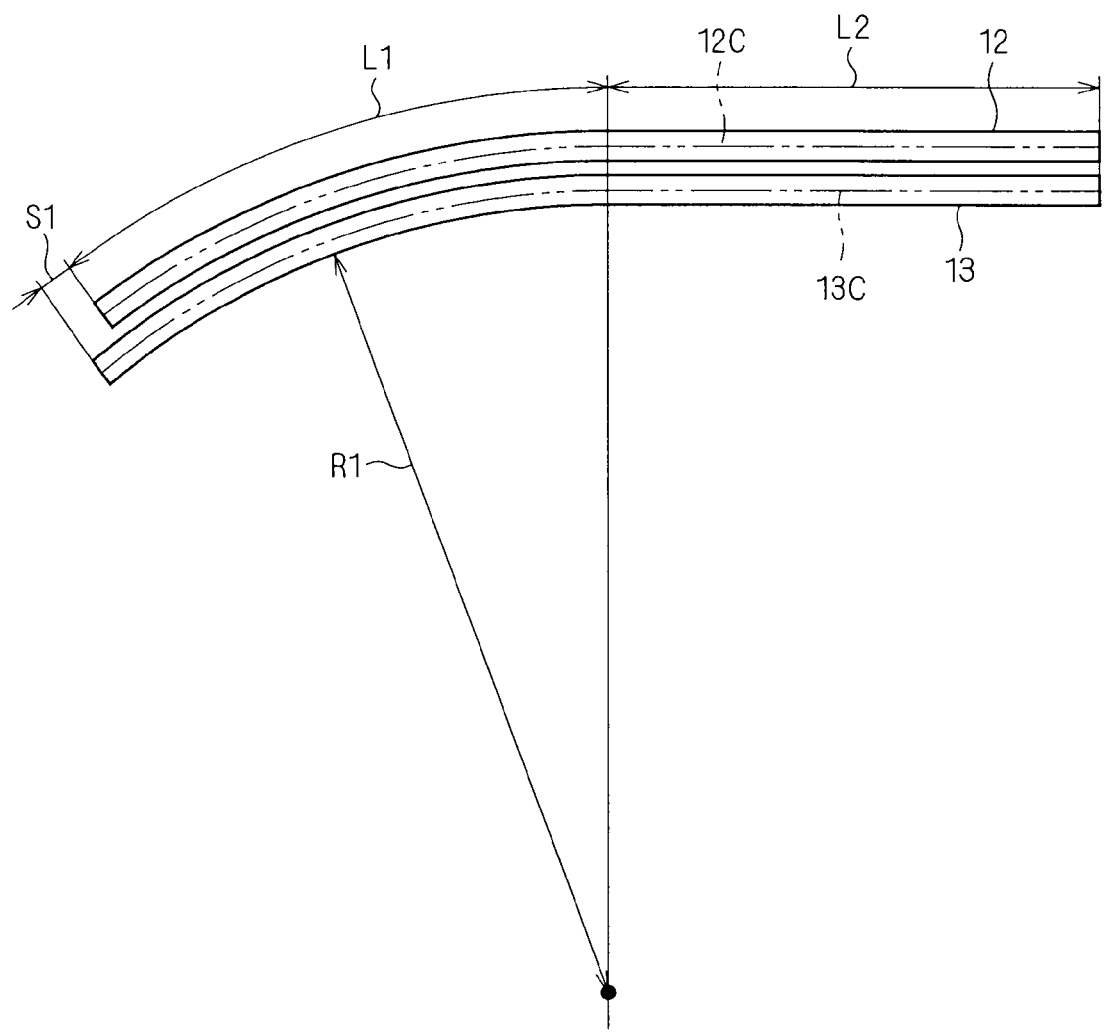
FIG. 34 is a cross section viewed from the plane of the array substrate 12 and the counter substrate 13 along the curve direction Y as the liquid crystal panel 75 is curved.

FIG. 34 is a cross section viewed from the plane of the array substrate 12 and the counter substrate 13 along the curve direction Y as the liquid crystal panel 75 is curved. In the preferred embodiment shown in FIG. 34, the long sides of the pixel structures 11 are arranged along the curve direction Y of the display surface. FIG. 34 shows positional misalignment occurring when part of the display surface having a length of L1 is curved concavely with the radius of curvature R1. The length of the remaining part of the display surface other than the above part (hereinafter, referred to as "curved part") is L2 and the remaining part is flat, not being curved. The remaining part is hereinafter referred to as "flat part".

FIG. 34 shows a cross section in a case where it is assumed that the main seal 52 only serves to keep the panel gap and the array substrate 12 and the counter substrate 13 freely move along the curve direction. When the array substrate 12 and the counter substrate 13 are fixed at a right end of the flat part, i.e., a right end of the display surface of FIG. 34, the maximum value of the length of positional misalignment at a left end of the curved part, i.e., a left end of the display surface, in other words, the maximum value S1 of the amount of positional misalignment is expressed by Eq. (4) assuming that each thickness of the array substrate 12 and the counter substrate 13 is T and the panel gap is d.

$$S1 = \frac{L1(T+d)}{R1} \qquad \text{(Eq. 4)}$$

Therefore, in the third preferred embodiment, the length of the black matrix opening 41a in the curve direction Y has only to be shorter than the length E of the long side of the pixel electrode 29 by not less than the maximum value S1 of the amount of positional misalignment. Specifically, the length of the black matrix opening 41a in the curve direction Y has only to be not longer than E−L1(T+d)/R1.

Like in the first preferred embodiment, this makes it possible to suppress the light leak occurring around the pixel electrode 29 provided in the pixel structure 11 and then suppress the display unevenness resulting from the positional misalignment between the array substrate 12 and the counter substrate 13 due to the curvature. Further, since the pixel structures 11 are arranged with their long sides along the curve direction Y of the display surface, it is possible to suppress a decrease in luminance due to the setting of the length of the black matrix opening 41a in the curve direction Y to be in the above range, as compared with the case where the pixel structures 11 are arranged with their short sides along the curve direction Y. Therefore, it is possible to provide a liquid crystal display achieving a high-quality image display with less display unevenness and high luminance.

FIG. 35 is a cross section viewed from the plane of the array substrate 12 and the counter substrate 13 along the curve direction Y in a case where the display surface is curved with different curvatures. Also in the preferred embodiment shown in FIG. 35, the long sides of the pixel structures 11 are arranged along the curve direction Y of the display surface. FIG. 35 shows positional misalignment caused when the display surface is curved concavely with different curvatures on left and right sides of the display surface. Specifically, FIG. 35 shows a case where part of the display surface having a length of L1 is curved concavely with the radius of curvature R1 and the remaining par of the display surface other than the above part (hereinafter, referred to as "the first curved part") is curved in the same direction as that of the first curved part with the radius of curvature R2 different from the radius of curvature of the first curved part. The remaining part is hereinafter referred to as "the second curved part", and the length of the second curved part in the curve direction Y is L2.

Like FIG. 34, FIG. 35 shows a cross section in the case where it is assumed that the main seal 52 only serves to keep the panel gap and the array substrate 12 and the counter substrate 13 freely move along the curve direction Y. When the array substrate 12 and the counter substrate 13 are fixed at a position where the radius of curvature is changed, i.e., a connection position of the first curved part and the second curved part, the maximum value S1 of the amount of positional misalignment that is the maximum value of the length of positional misalignment at a left end of the display surface, i.e., at a left end of the first curved part, is expressed by above-discussed Eq. (4), and the maximum value S2 of the amount of positional misalignment that is the maximum value of the length of positional misalignment at a right end of the display surface, i.e., at a right end of the second curved part, is expressed by Eq. (5) assuming that each thickness of the array substrate 12 and the counter substrate 13 is T and the panel gap is d.

$$S2 = \frac{L2(T+d)}{R2} \qquad \text{(Eq. 5)}$$

Therefore, in this preferred embodiment, the length of the black matrix opening 41a in the curve direction Y has only to be shorter than the length E of the long side of the pixel electrode 29 by not less than the sum (S1+S2) of the maximum value S1 of the amount of positional misalignment at the first curved part and the maximum value S2 of the amount of positional misalignment at the second curved part. Specifically, the length of the black matrix opening 41a in the curve direction Y has only to be not longer than E−{L1(T+d)/R1+ L2(T+d)/R2}.

Like in the first preferred embodiment, this makes it possible to suppress the light leak occurring around the pixel electrode 29 provided in the pixel structure 11 and then suppress the display unevenness resulting from the positional misalignment between the array substrate 12 and the counter substrate 13 due to the curvature. Further, since the pixel structures 11 are arranged with their long sides along the curve direction Y of the display surface, it is possible to suppress a decrease in luminance due to the setting of the length of the black matrix opening 41a in the curve direction Y to be in the above range, as compared with the case where the pixel structures 11 are arranged with their short sides along the curve direction Y. Therefore, it is possible to provide a liquid crystal display achieving a high-quality image display with less display unevenness and high luminance.

In the case where the curvature is asymmetrical on the right and left sides of the display surface, like the two cases shown in FIGS. 34 and 35, including a case where the left side or the right side of the display surface is flat, the positional misalignment occurs nonuniformly on the left and right sides of the display surface and depends on the curvatures R1 and R2 and the lengths L1 and L2 on the left and right sides of the display surface. Therefore, in this case, the length of the black matrix opening 41a along the curve direction Y has only to be the above predetermined length and the relative position of the array substrate 12 and the counter substrate 13 has only to be set in consideration of the positional misalignment to be caused in the case where the display surface is actually curved. Specifically, the paste position of the array substrate 12 and the counter substrate 13 has only to be controlled in consideration of the positional misalignment to be caused in the case where the display surface is actually curved.

Figure 36:
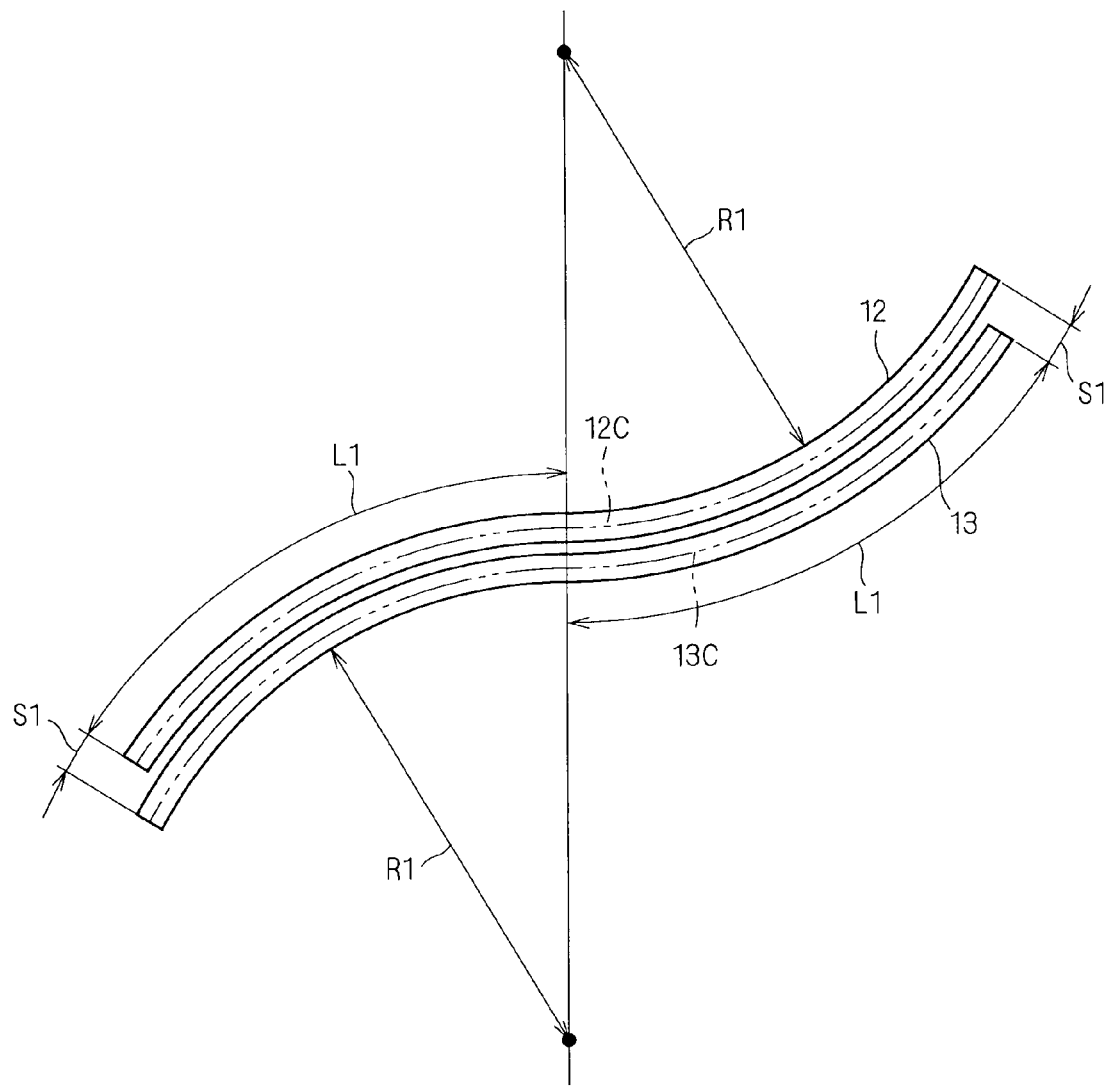
FIG. 36 is a cross section viewed from the plane of the array substrate 12 and the counter substrate 13 along the curve direction Y in a case where the display surface is curved concavely and convexly.

FIG. 36 is a cross section viewed from the plane of the array substrate 12 and the counter substrate 13 along the curve direction Y in a case where the display surface is curved concavely and convexly. Also in the preferred embodiment shown in FIG. 36, the long sides of the pixel structures 11 are arranged along the curve direction Y of the display surface. FIG. 36 shows positional misalignment caused when the display surface is curved in reverse directions on left and right sides of the display surface. Specifically, FIG. 36 shows a case where one half of the display surface having a length of L1 is curved concavely with the radius of curvature R1 and the remaining half of the display surface other than the above half (hereinafter, referred to as "the concavely-curved part") is curved in a direction reverse to the direction in which the concavely-curved part is curved, specifically, curved convexly with the same radius of curvature as that of the concavely-curved part. The remaining part which is curved convexly is hereinafter referred to as "the convexly-curved part", and the length of the convexly-curved part in the curve direction Y is L1.

Like FIG. 35, FIG. 36 shows a cross section in the case where it is assumed that the main seal 52 only serves to keep the panel gap and the array substrate 12 and the counter substrate 13 freely move along the curve direction Y. When the array substrate 12 and the counter substrate 13 are fixed at a position where the direction of curvature is changed, i.e., a connection position of the concavely-curved part and the convexly-curved part, the maximum value S1 of the amount of positional misalignment that is the maximum value of the length of positional misalignment at both ends of the display surface in the curve direction Y is expressed by above-discussed Eq. (4).

As shown in FIG. 36, when the display surface is curved in reverse directions on its left and right sides, the direction of positional misalignment does not change on its left and right sides. In an actual liquid crystal panel, since both the left and right ends of the display area of the array substrate 12 and the counter substrate 13 are fixed by the main seal 52, in the convexly-curved part on the right side of FIG. 36, the pixel structures 11 on the side of the counter substrate 13 are shifted rightward and the maximum value S1 of the amount of positional misalignment is expressed by above-discussed Eq. (4). Further, in the concavely-curved part on the left side of FIG. 36, the pixel structures 11 on the side of the counter substrate 13 are shifted leftward and the maximum value S1 of the amount of positional misalignment is expressed by above-discussed Eq. (4).

Therefore, in this preferred embodiment, the length of the black matrix opening 41a in the curve direction Y has only to be shorter than the length E of the long side of the pixel electrode 29 by not less than the maximum value S1 of the amount of positional misalignment in either the convexly-curved part or the concavely-curved part. Specifically, the length of the black matrix opening 41a in the curve direction Y has only to be not longer than E−L1(T+d)/R1.

Like in the first preferred embodiment, this makes it possible to suppress the light leak occurring around the pixel electrode 29 provided in the pixel structure 11 and then suppress the display unevenness resulting from the positional misalignment between the array substrate 12 and the counter substrate 13 due to the curvature. Further, since the pixel structures 11 are arranged with their long sides along the curve direction Y of the display surface, it is possible to suppress a decrease in luminance due to the setting of the length of the black matrix opening 41a in the curve direction Y to be in the above range, as compared with the case where the pixel structures 11 are arranged with their short sides along the curve direction Y. Therefore, it is possible to provide a liquid crystal display achieving a high-quality image display with less display unevenness and high luminance.

Figure 37:
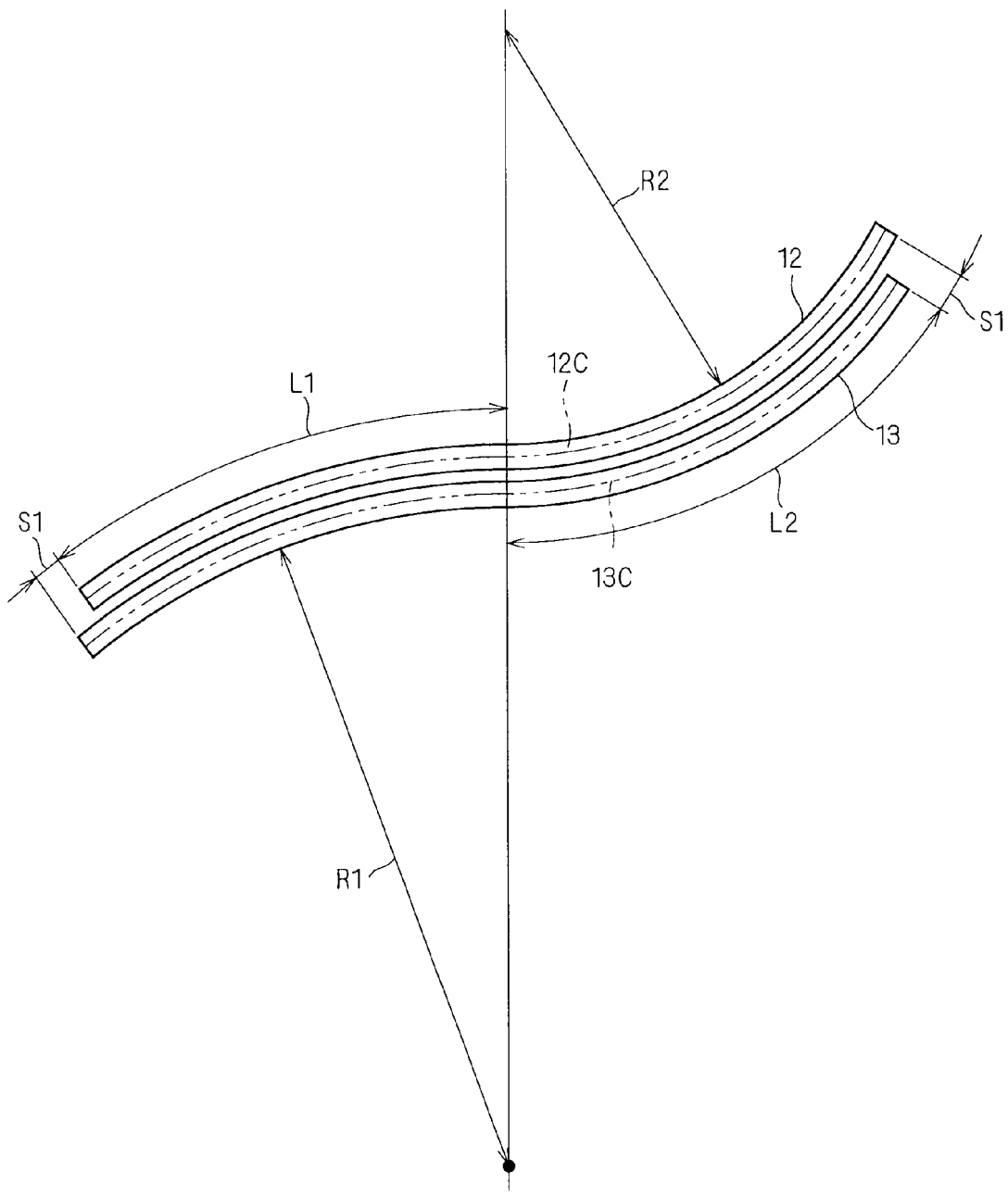
FIG. 37 is a cross section viewed from the plane of the array substrate 12 and the counter substrate 13 along the curve direction Y in another example in the case where the display surface is curved concavely and convexly.

FIG. 37 is a cross section viewed from the plane of the array substrate 12 and the counter substrate 13 along the curve direction Y in another example in the case where the display surface is curved concavely and convexly. Also in the preferred embodiment shown in FIG. 37, the long sides of the pixel structures 11 are arranged along the curve direction Y of the display surface. FIG. 37 shows positional misalignment caused when the display surface is curved in reverse directions on left and right sides of the display surface with different curvatures. Specifically, FIG. 37 shows a case where part of the display surface having a length of L1 is curved concavely with the radius of curvature R1 and the remaining part of the display surface other than the above part (hereinafter, referred to as "the concavely-curved part") is curved convexly with the radius of curvature R2 different from that of the concavely-curved part. The remaining part which is curved convexly is hereinafter referred to as "the convexly-curved part", and the length of the convexly-curved part in the curve direction Y is L2.

Like FIG. 36, FIG. 37 shows a cross section in the case where it is assumed that the main seal 52 only serves to keep the panel gap and the array substrate 12 and the counter substrate 13 freely move along the curve direction Y. When the array substrate 12 and the counter substrate 13 are fixed at a position where the direction of curvature is changed, i.e., a connection position of the concavely-curved part and the convexly-curved part, the maximum value S1 of the amount of positional misalignment that is the maximum value of the length of positional misalignment at the left end of the display surface in FIG. 37, i.e., at the concavely-curved part is expressed by above-discussed Eq. (4), and the maximum value S2 of the amount of positional misalignment that is the maximum value of the length of positional misalignment at the right end of the display surface, i.e., at the convexly-curved part is expressed by above-discussed Eq. (5).

Like in the preferred embodiment shown in FIG. 36, also in the preferred embodiment shown in FIG. 37, the direction of positional misalignment does not change on the left and right sides, and the maximum value of the amount of positional misalignment in the entire liquid crystal panel is a larger one of the maximum value S1 of the amount of positional misalignment in the concavely-curved part and the maximum value S2 of the amount of positional misalignment in the convexly-curved part. The length of the black matrix opening 41a in the curve direction Y has only to be shorter than the length E of the long side of the pixel electrode 29 by not less than the maximum value of the amount of positional misalignment in the entire liquid crystal panel. If the maximum value S1 of the amount of positional misalignment in the concavely-curved part is equal to or larger than the maximum value S2 of the amount of positional misalignment in the convexly-curved part (S1≧S2), the length of the black matrix opening 41a in the curve direction Y has only to be shorter than the length E of the long side of the pixel electrode 29 by not less than the maximum value S1 of the amount of positional misalignment in the concavely-curved part, and specifically, the length of the black matrix opening 41a in the curve direction Y has only to be not longer than E−L1(T+d)/R1.

Like in the first preferred embodiment, this makes it possible to suppress the light leak occurring around the pixel electrode 29 provided in the pixel structure 11 and then suppress the display unevenness resulting from the positional misalignment between the array substrate 12 and the counter substrate 13 due to the curvature. Further, since the pixel structures 11 are arranged with their long sides along the curve direction Y of the display surface, it is possible to suppress a decrease in luminance due to the setting of the length of the black matrix opening 41a in the curve direction Y to be in the above range, as compared with the case where the pixel structures 11 are arranged with their short sides along the curve direction Y. Therefore, it is possible to provide a liquid crystal display achieving a high-quality image display with less display unevenness and high luminance.

Figure 38:
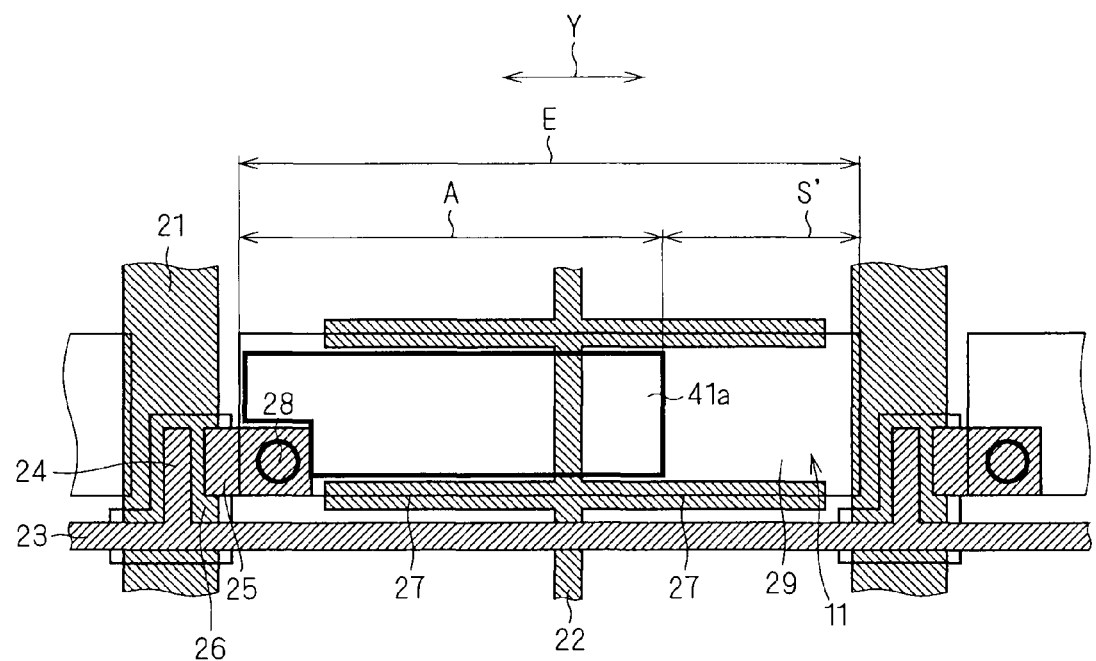
FIG. 38 is a plan view showing the black matrix opening 41a in a case where the left and right sides of the display surface are curved in reverse directions.

FIG. 38 is a plan view showing the black matrix opening 41a in a case where the left and right sides of the display surface are curved in reverse directions. Like the above two cases shown in FIGS. 36 and 37, in the case where the left and right sides of the display surface are curved in reverse directions, the positional misalignment occurs in one direction of left and right of the display surface. Therefore, as shown in FIG. 38, by disposing one end portion of the black matrix opening 41a in the curve direction Y to be aligned with the one end portion of the pixel electrode 29 and setting the length of the black matrix opening 41a in the curve direction Y to be in the above range, it is possible to suppress the light leak due to the positional misalignment. For example, if the pixel structures 11 on the side of the counter substrate 13 are shifted rightward of FIG. 38, as shown in FIG. 38, the black matrix opening 41a has only to be arranged with its one end portion in the curve direction Y being aligned with one end portion of the pixel electrode 29, thereby being deviated to the left side of the pixel electrode 29.

While the invention has been shown and described in detail, the foregoing description is in all aspects illustrative and not restrictive. It is therefore understood that numerous modifications and variations can be devised without departing from the scope of the invention.

What is claimed is:

1. A liquid crystal display comprising:
an array substrate having a plurality of rectangular pixel structures which are arranged in matrix;
a counter substrate opposed to said array substrate, having a color filter and a black matrix; and
a liquid crystal layer held between said array substrate and said counter substrate,
said liquid crystal display having a curved display surface formed of said array substrate and said counter substrate both being curved,
wherein long sides of said pixel structures are arranged along a curve direction of said display surface,
a rectangular pixel electrode is provided in each of said pixel structures, with its long side being arranged along the long side of the pixel structure, and
assuming that the length of said display surface in said curve direction is L, the thickness of said array substrate is T1, the thickness of said counter substrate is T2, the size of a gap between said array substrate and said counter substrate is d, the radius of curvature of the curved display surface is R and the length of the long side of the pixel electrode provided in each of said pixel structures is E, the length of an opening sectioned by said black matrix in said curve direction is not longer than E−L {(T1/2)+(T2/2)+d}/R.

2. A liquid crystal display comprising:
an array substrate having a plurality of rectangular pixel structures which are arranged in matrix;
a counter substrate opposed to said array substrate, having a color filter and a black matrix; and
a liquid crystal layer held between said array substrate and said counter substrate,
said liquid crystal display having a curved display surface formed of said array substrate and said counter substrate both being curved,
wherein long sides of said pixel structures are arranged along a curve direction of said display surface, and
assuming that the length of said display surface in said curve direction is L, the thickness of said array substrate is T1, the thickness of said counter substrate is T2, the size of a gap between said array substrate and said counter substrate is d, the radius of curvature of the curved display surface is R and the length of the long side of each of said pixel structures is P, the length of an opening sectioned by said black matrix in said curve direction is not longer than P−L {(T1/2)+(T2/2)+d}/R.

3. The liquid crystal display according to claim 1, wherein said liquid crystal layer is in a twisted nematic mode of 6 o'clock viewing angle or 12 o'clock viewing angle toward said display surface, and said curve direction is a horizontal direction of said display surface.

4. The liquid crystal display according to claim 2, wherein said liquid crystal layer is in a twisted nematic mode of 6 o'clock viewing angle or 12 o'clock viewing angle toward said display surface, and said curve direction is a horizontal direction of said display surface.

5. The liquid crystal display according to claim 1, wherein a signal wire is disposed along said curve direction and a scanning wire and a common wire are disposed in a direction orthogonal to said curve direction.

6. The liquid crystal display according to claim 2, wherein a signal wire is disposed along said curve direction and a scanning wire and a common wire are disposed in a direction orthogonal to said curve direction.

* * * * *